(12) United States Patent (10) Patent No.: US 8,068,570 B2
Catreux et al. (45) Date of Patent: *Nov. 29, 2011

(54) WEIGHT GENERATION METHOD FOR MULTI-ANTENNA COMMUNICATION SYSTEMS UTILIZING RF-BASED AND BASEBAND SIGNAL WEIGHTING AND COMBINING BASED UPON MINIMUM BIT ERROR RATE

(75) Inventors: Severine Catreux, Cardiff, CA (US); Vinko Erceg, Cardiff, CA (US); Pieter Roux, San Diego, CA (US); Pieter Van Rooyen, San Diego, CA (US); Jack Winters, Middletown, NJ (US)

(73) Assignee: Broadcom Corporation

( * ) Notice: Subject to any disclaimer, the term of this patent is extended or adjusted under 35 U.S.C. 154(b) by 0 days.

This patent is subject to a terminal disclaimer.

(21) Appl. No.: 12/401,151

(22) Filed: Mar. 10, 2009

(65) Prior Publication Data

US 2009/0238310 A1 Sep. 24, 2009

Related U.S. Application Data

(63) Continuation of application No. 10/891,443, filed on Jul. 13, 2004, now Pat. No. 7,502,432.

(60) Provisional application No. 60/488,845, filed on Jul. 21, 2003.

(51) Int. Cl.
*H04B 7/10* (2006.01)
(52) U.S. Cl. ........................................................ 375/347
(58) Field of Classification Search .................... 375/347
See application file for complete search history.

(56) References Cited

U.S. PATENT DOCUMENTS

| 5,796,779 | A | 8/1998 | Nussbaum et al. |
| 5,875,216 | A | 2/1999 | Martin |
| 6,044,120 | A | 3/2000 | Bar-David et al. |
| 6,097,773 | A | 8/2000 | Carter et al. |
| 6,115,426 | A | 9/2000 | Fujimoto et al. |
| 6,483,459 | B1 * | 11/2002 | Hou et al. ............... 342/378 |
| 6,873,651 | B2 | 3/2005 | Tesfai et al. |
| 2002/0003842 | A1 * | 1/2002 | Suzuki et al. ............ 375/259 |
| 2002/0085653 | A1 | 7/2002 | Matsuoka et al. |
| 2002/0105472 | A1 | 8/2002 | Voyer |
| 2002/0118781 | A1 * | 8/2002 | Thomas et al. ........... 375/347 |
| 2004/0028157 | A1 * | 2/2004 | Aoki et al. .............. 375/347 |
| 2004/0032910 | A1 | 2/2004 | Horng et al. |

FOREIGN PATENT DOCUMENTS

| CN | 1304218 | 7/2001 |
| WO | 02/080375 | 10/2002 |

* cited by examiner

*Primary Examiner* — Kevin Kim
(74) *Attorney, Agent, or Firm* — McAndrews, Held & Malloy, Ltd.

(57) ABSTRACT

A method for processing communication signals is disclosed and may include, in a receiver and/or a baseband processor coupled to the receiver, the receiver comprising a plurality of antennas, generating a plurality of RF weighting values based on one or more output bit error rates of the receiver. A plurality of spatially-multiplexed RF signals, which are received by the receiver, may be weighted with the one or more of the generated plurality of RF weighting values, to form a plurality of weighted RF signals. Two or more of the generated plurality of weighted RF signals may be combined to form one or more combined RF signals. Each of the one or more combined RF signals may be processed by a different RF processing chain. The one or more output bit error rates of the receiver may be minimized by the generation of the plurality of RF weighting values.

18 Claims, 10 Drawing Sheets

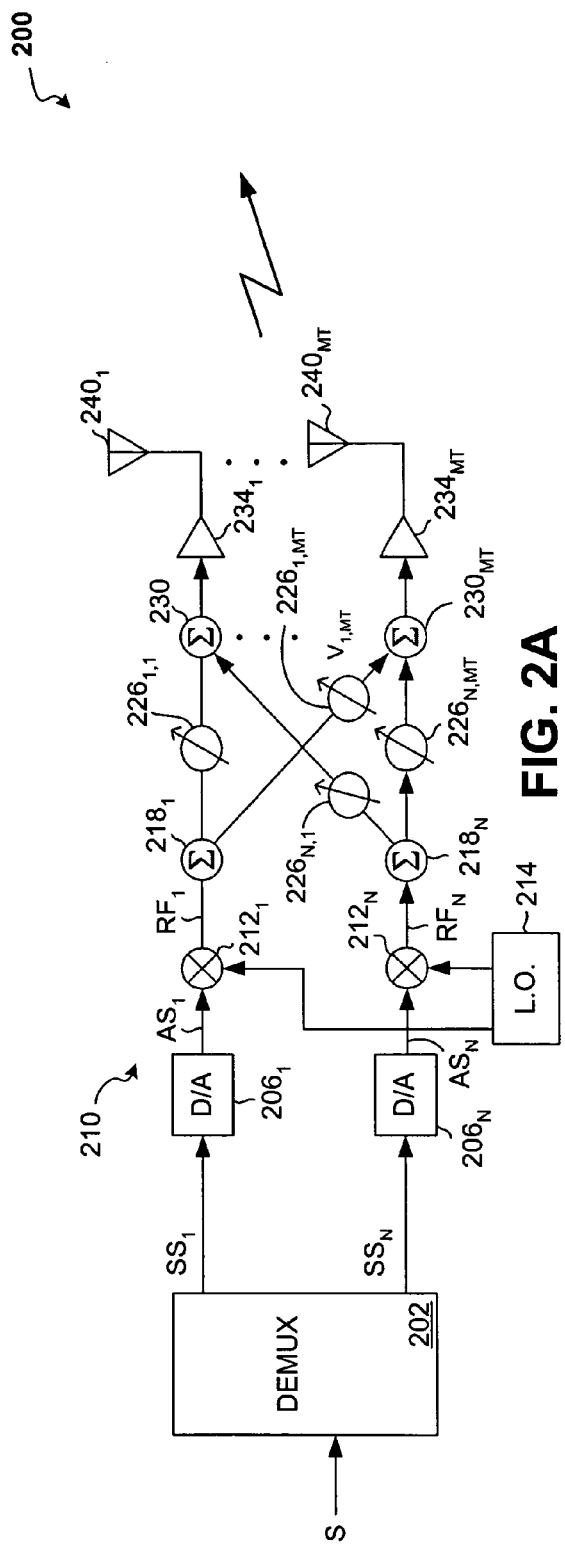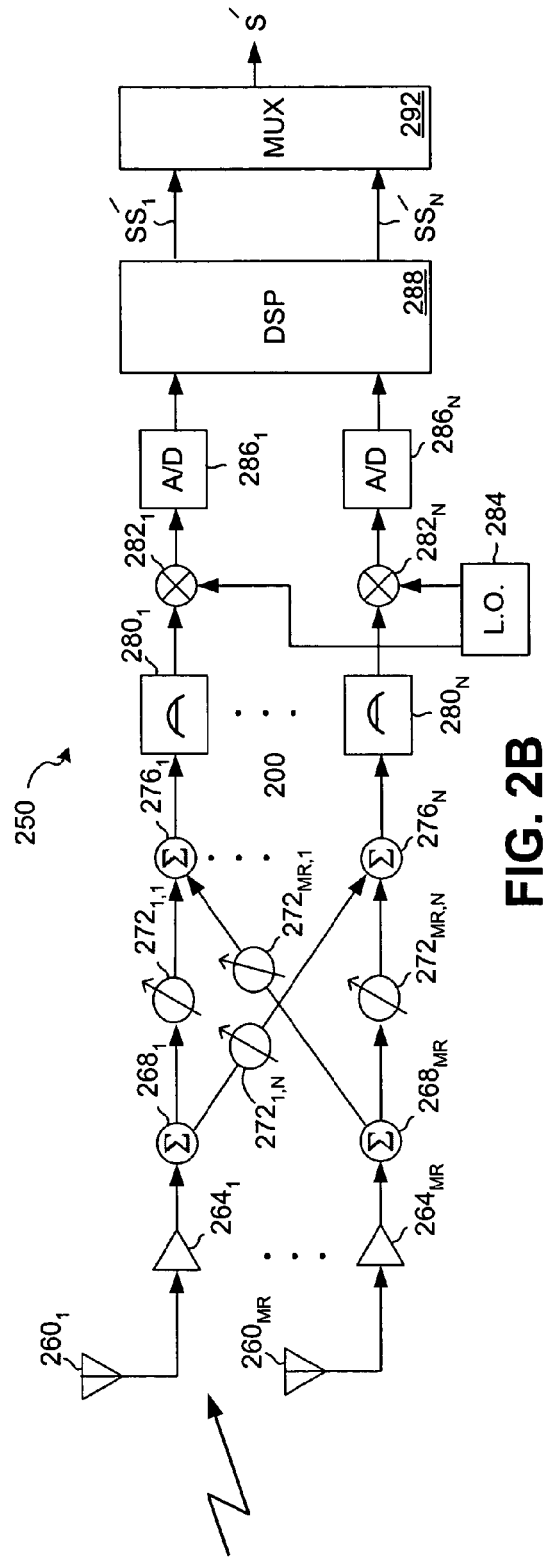

WEIGHT GENERATION METHOD FOR MULTI-ANTENNA COMMUNICATION SYSTEMS UTILIZING RF-BASED AND BASEBAND SIGNAL WEIGHTING AND COMBINING BASED UPON MINIMUM BIT ERROR RATE

CROSS-REFERENCE TO RELATED APPLICATIONS

This application is a continuation of U.S. patent application Ser. No. 10/891,443, filed Jul. 13, 2004 (now U.S. Pat. No. 7,502,432), which claims priority under 35 U.S.C. §119(e) to U.S. provisional application Ser. No. 60/488,845 entitled WEIGHT GENERATION METHOD FOR RF SIGNAL COMBINING IN MULTI-ANTENNA COMMUNICATION SYSTEMS BASED UPON MINIMUM BIT ERROR RATE, filed Jul. 21, 2003, which is herein incorporated by reference in its entirety. This application is also related to copending U.S. non-provisional application Ser. No. 10/801,930, entitled MULTI-ANTENNA COMMUNICATION SYSTEMS UTILIZING RF-BASED AND BASEBAND SIGNAL WEIGHTING AND COMBINING, filed Mar. 16, 2004, to copending U.S. non-provisional application Ser. No. 10/835,255, entitled WEIGHT GENERATION METHOD FOR MULTI-ANTENNA COMMUNICATION SYSTEMS UTILIZING RF-BASED AND BASEBAND SIGNAL WEIGHTING AND COMBINING, to copending U.S. provisional application Ser. No. 60/491,128, entitled FREQUENCY SELECTIVE TRANSMIT SIGNAL WEIGHTING FOR MULTIPLE ANTENNA SYSTEMS, and to U.S. provisional application Ser. No. 60/485,915, entitled SYSTEM AND METHOD FOR RF SIGNAL COMBINING AND ADAPTIVE BIT LOADING FOR DATA RATE MAXIMIZATION IN MULTI-ANTENNA COMMUNICATION SYSTEMS, filed Jul. 9, 2003, all of which are assigned to the assignee of the present application.

FIELD OF THE INVENTION

The present invention relates to communication systems utilizing transmitters and receivers having multiple antenna elements. More particularly, the present invention relates to a weight generation method for facilitating RF-based signal weighting and combining, either exclusively or in combination with baseband signal weighting and combining, in connection with transmission and reception of signals using multi-antenna transmitters and receivers.

BACKGROUND OF THE INVENTION

Most current wireless communication systems are composed of nodes configured with a single transmit and receive antenna. However, for a wide range of wireless communication systems, it has been predicted that the performance, including capacity, may be substantially improved through the use of multiple transmit and/or multiple receive antennas. Such configurations form the basis of many so-called "smart" antenna techniques. Such techniques, coupled with space-time signal processing, can be utilized both to combat the deleterious effects of multipath fading of a desired incoming signal and to suppress interfering signals. In this way both the performance and capacity of digital wireless systems in existence or being deployed (e.g., CDMA-based systems, TDMA-based systems, WLAN systems, and OFDM-based systems such as IEEE 802.11a/g) may be improved.

The impairments to the performance of wireless systems of the type described above may be at least partially ameliorated by using multi-element antenna systems designed to introduce a diversity gain and suppress interference within the signal reception process. This has been described, for example, in "The Impact of Antenna Diversity On the Capacity of Wireless Communication Systems", by J. H. Winters et al, IEEE Transactions on Communications, vol. 42, No. 2/3/4, pages 1740-1751, February 1994. Such diversity gains improve system performance by mitigating multipath for more uniform coverage, increasing received signal-to-noise ratio for greater range or reduced required transmit power, and providing more robustness against interference or permitting greater frequency reuse for higher capacity.

Within communication systems incorporating multi-antenna receivers, it is known that a set of M receive antennas are capable of nulling up to M-1 interferers. Accordingly, N signals may be simultaneously transmitted in the same bandwidth using N transmit antennas, with the transmitted signal then being separated into N respective signals by way of a set of N antennas deployed at the receiver. Systems of this type are generally referred to as multiple-input-multiple-output (MIMO) systems, and have been studied extensively. See, for example, "Optimum combining for indoor radio systems with multiple users," by J. H. Winters, IEEE Transactions on Communications, Vol. COM-35, No. 11, November 1987; "Capacity of Multi-Antenna Array Systems In Indoor Wireless Environment" by C. Chuah et al, Proceedings of Globecom '98 Sydney, Australia, IEEE 1998, pages 1894-1899 November 1998; and "Fading Correlation and Its Effect on the Capacity of Multi-Element Antenna Systems" by D. Shiu et al, IEEE Transactions on Communications vol. 48, No. 3, pages 502-513 March 2000.

One aspect of the attractiveness of multi-element antenna arrangements, particularly MIMOs, resides in the significant system capacity enhancements that can be achieved using these configurations. Under the assumption of perfect estimates of the applicable channel at the receiver, in a MIMO system with N transmit and N receive antenna elements, the received signal decomposes to N "spatially-multiplexed" independent channels. This results in an N-fold capacity increase relative to single-antenna systems. For a fixed overall transmitted power, the capacity offered by MIMOs scales linearly with the number of antenna elements. Specifically, it has been shown that with N transmit and N receive antennas an N-fold increase in the data rate over a single antenna system can be achieved without any increase in the total bandwidth or total transmit power. See, e.g., "On Limits of Wireless Communications in a Fading Environment When Using Multiple Antennas", by G. J. Foschini et al, Wireless Personal Communications, Kluwer Academic Publishers, vol. 6, No. 3, pages 311-335, March 1998. In experimental MIMO systems predicated upon N-fold spatial multiplexing, more than N antennas are often deployed at a given transmitter or receiver. This is because each additional antenna adds to the diversity gain and antenna gain and interference suppression applicable to all N spatially-multiplexed signals. See, e.g., "Simplified processing for high spectral efficiency wireless communication employing multi-element arrays", by G. J. Foschini, et al, IEEE Journal on Selected Areas in Communications, Volume: 17 Issue: 11, November 1999, pages 1841-1852.

Although increasing the number of transmit and/or receive antennas enhances various aspects of the performance of MIMO systems, the necessity of providing a separate RF chain for each transmit and receive antenna increases costs. Each RF chain is generally comprised a low noise amplifier, filter, downconverter, and analog to digital to converter (A/D), with the latter three devices typically being responsible for most of the cost of the RF chain. In certain existing single-antenna wireless receivers, the single required RF chain may account for in excess of 30% of the receiver's total cost. It is thus apparent that as the number of transmit and receive antennas increases, overall system cost and power consumption may dramatically increase. It would therefore be desirable to provide a technique for utilizing relatively larger numbers of transmit/receive antennas without proportionately increasing system costs and power consumption.

The first of the above-referenced non-provisional patent applications provides such a technique by describing a wireless communication system in which it is possible to use a smaller number of RF chains within a transmitter and/or receiver than the number of transmit/receiver antennas utilized. In the case of an exemplary receiver implementation, the signal provided by each of M (M>N) antennas is passed through a low noise amplifier and then split, weighted and combined in the RF domain with the signals from the other antennas of the receiver. This forms N RF output signals, which are then passed through N RF chains. The output signals produced by an A/D converter of each RF chain are then digitally processed to generate the N spatially-multiplexed output signals. By performing the requisite weighting and combining at RF using relatively inexpensive components, an N-fold spatially-multiplexed system having more than N receive antennas, but only N RF chains, can be realized at a cost similar to that of a system having N receive antennas. That is, receiver performance may be improved through use of additional antennas at relatively low cost. A similar technique can be used within exemplary transmitter implementations incorporating N RF chains and more than N transmit antennas.

However, optimal performance of systems utilizing RF weighting and combining may only be achieved through appropriate selection of RF combining weights. Unfortunately, it has heretofore not been clear as to which performance measure should be utilized in generating the weights, or precisely how the weights should be generated once such a metric has been selected, in order to optimize performance. In fact, without proper weight generation, the performance of multi-antenna systems using RF weighting may be worse than that of systems using only a single antenna. Accordingly, in the above-referenced copending application Ser. No. 10/835,255, a weight generation method based upon maximizing the output signal-to-noise ratio was proposed. Although output signal-to-noise ratio constitutes an acceptable performance measure with respect to which a communication system may be designed and evaluated, the bit error rate of a communication system is also commonly used in gauging its performance.

SUMMARY OF THE INVENTION

The present invention is directed to a system and method for generating weight values for weighting elements included within the signal weighting and combining arrangements used in various multi-antenna transmitter and receiver structures. Specifically, the present invention may be applied to RF-based weighting and combining arrangements within such multi-antenna transmitter and receiver structures. The present invention may also find application when both RF-based and baseband weighting and combining arrangements are incorporated within the same multi-antenna transmitter or receiver structure.

In a particular aspect the invention is directed to a signal weighting and combining method practiced within a receiver having a plurality of receive antennas disposed to produce, in response to a transmitted RF signal received through a channel, a corresponding plurality of received RF signals. The method includes weighting the plurality of received RF signals in accordance with a corresponding plurality of RF weighting values selected to minimize an output bit error rate of the receiver, thereby forming a plurality of weighted RF signals. The method also includes combining ones of the plurality of weighted RF signals in order to form one or more combined RF signals.

The present invention also relates to an RF splitting and weighting method practiced within a multi-antenna transmitter. The transmitter is disposed to transmit an RF input signal through a plurality of transmit antennas so as to produce a corresponding plurality of RF output signals, each of which is received by a receiver after propagating through a channel. The method includes dividing the RF input signal in order to form a plurality of divided RF signals. These divided RF signals are then weighted in accordance with a corresponding plurality of RF weighting values selected to minimize an output bit error rate of the receiver, thereby forming the plurality of RF output signals.

In another aspect the invention is directed to an RF processing method used within a communication system including a transmitter having a set of transmit antennas disposed to transmit a set of spatially-multiplexed RF output signals through a channel. The communication system also includes a receiver having a plurality of receive antennas disposed to generate a corresponding first plurality of spatially-multiplexed received RF signals in response to receipt of the spatially-multiplexed RF output signals. The method includes generating the set of spatially-multiplexed RF output signals by performing a splitting and weighting operation upon plural RF input signals. This splitting and weighting operation utilizes a first set of RF weighting values selected in accordance with one or more output bit error rates of the receiver. The method further includes forming a second plurality of spatially-multiplexed received RF signals by performing a weighting and combining operation upon the first plurality of spatially-multiplexed received RF signals. Consistent with this aspect of the invention, this weighting and combining operation utilizes a second set of RF weighting values selected in accordance with the one or more output bit error rates.

In yet another aspect the invention relates to a signal weighting and combining method capable of being practiced within a receiver having a plurality of receive antennas. In operation, the receiver is disposed to produce a like plurality of spatially-multiplexed received RF signals in response to receipt through a channel of spatially-multiplexed transmitted RF signal energy. The method includes weighting the plurality of spatially-multiplexed received RF signals utilizing a corresponding plurality of RF weighting values selected in accordance with one or more output bit error rates of the receiver, thereby forming a plurality of spatially-multiplexed weighted RF signals. The method further includes combining ones of the plurality of spatially-multiplexed weighted RF signals in order to form one or more spatially-multiplexed combined RF signals.

The present invention is also directed to an RF splitting and weighting method for use within a multi-antenna transmitter. In operation, the transmitter is disposed to transmit a spatially-multiplexed RF input signal through a plurality of transmit antennas so as to produce a corresponding plurality of spatially-multiplexed RF output signals. Each of the spatially-multiplexed RF output signals is received by a receiver after propagating through a channel. The method includes dividing the spatially-multiplexed RF input signal in order to form a plurality of spatially-multiplexed divided RF signals. The plurality of spatially-multiplexed divided RF signals are then weighted utilizing a corresponding plurality of RF weighting values selected in accordance with one or more output bit error rates of the receiver, thereby forming the plurality of spatially-multiplexed RF output signals.

The present invention further relates to an RF processing method capable of being practiced within a communication system including a transmitter and a receiver. The transmitter has a set of transmit antennas disposed to transmit a set of RF output signals through a channel, and the receiver has a plurality of receive antennas disposed to generate a corresponding plurality of received RF signals in response to receipt of the RF output signals. The method includes generating the set of RF output signals by performing a splitting and weighting operation upon an RF input signal. Consistent with the invention, the splitting and weighting operation utilizes a first set of RF weighting values selected to minimize an output bit error rate of the receiver. The method further includes generating one or more received combined RF signals by performing a weighting and combining operation upon the plurality of received RF signals which similarly utilizes a second set of RF weighting values selected to minimize the output bit error rate.

BRIEF DESCRIPTION OF THE DRAWINGS

For a better understanding of the nature of the features of the invention, reference should be made to the following detailed description taken in conjunction with the accompanying drawings, in which:

FIG. 2 shows a block diagram of a MIMO communication system having a transmitter and a receiver configured to effect RF-based weighting and combining.

DETAILED DESCRIPTION OF THE INVENTION

Introduction

Figure 1A:
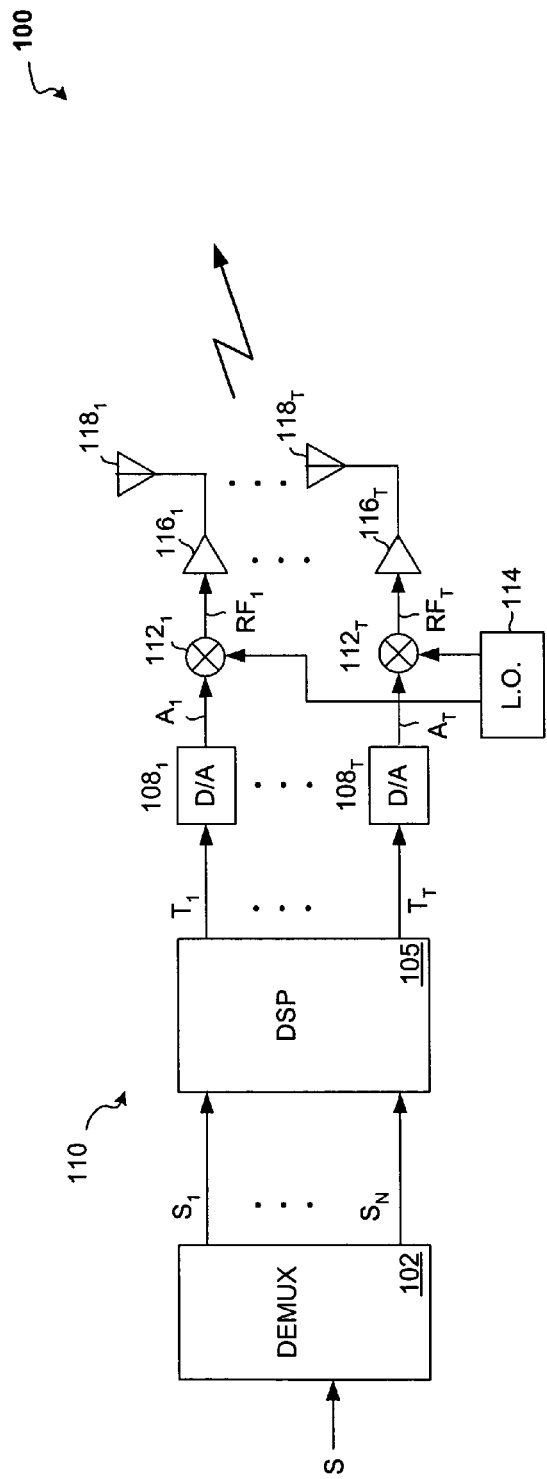
FIG. 1 illustratively represents a conventional MIMO communication system.

As is discussed below, the present invention is directed to a method of weighting and combining for use in multi-antenna systems, including N-fold spatially-multiplexed multi-antenna systems. In a particular embodiment of the invention, the weighting values for a given signal combining arrangement are set so as to minimize the bit error rate of the applicable multi-antenna system. The inventive weight generation method may be employed within several different types of multi-antenna communication systems including, for example, those described within the above-referenced copending non-provisional application. In particular embodiments the inventive technique may be applied to a multi-antenna receiver within a "single channel" (SC) system (i.e., a system lacking spatial multiplexing), to a multi-antenna transmitter in a single channel system, or to the transmitter or receiver of a MIMO system employing spatial multiplexing (SM).

The present invention contemplates that the weighting values or "weights" may generally be calculated by searching over a weight space to find a set of weights which minimize the applicable bit error rate (BER). This can be done by a global search, i.e., by searching over a set of quantized weight values within the weight space and choosing a set which minimizes the BER. Since the BER will often be a complicated function of a given set of weights, a unique approximation of the BER for a given set of weights which varies with the coding and modulation method employed may instead be utilized in certain embodiments. In addition, simulated annealing may be used in other embodiments in order to speed the process of finding the optimum weights that minimize the approximated BER described above.

When the teachings of the invention are applied to a multi-antenna receiver structure incorporating an RF-based weighting and combining arrangement, a single frequency-independent weight is typically defined such that the constituent set of weight coefficients are constant over a given channel domain. That is, the weight coefficients will generally be invariant over the frequency bandwidth, tap delay profile, time impulse response, and the Rake fingers profile of the channel. In this case the weights are chosen so as to minimize the BER of the receiver, which results in generation of a one-dimensional weight vector w that is common to the entire channel frequency band. A substantially similar approach may be used to generate the values for the weighting elements of RF-based weighting and combining arrangements configured for inclusion within multi-antenna transmitter structures.

When a multi-antenna receiver structure is configured to include both RF-based and baseband weighting and combining arrangements, the weighting values for the baseband arrangement are typically computed in a manner consistent with the invention over both space and frequency. Each such computation is performed so as to minimize the BER with respect to a given signal component (e.g., a signal tone or tap delay) with knowledge of the channel frequency response associated with such signal component. Alternatively, the RF and baseband weights can be calculated jointly so as to minimize the BER of the receiver output signal. Once the baseband weights have been computed, an M-dimensional weight vector $w_k$ is formed, where M denotes the number of antenna elements of the multi-antenna receiver structure. During operation, signals incident upon the M antenna elements of the receiver structure are collected into an M-dimensional received signal vector. Each signal component inherent within each of the M received signals represented by the M-dimensional received signal vector is then multiplied by the M-dimensional weight vector $w_k$. A substantially similar approach may be used to generate the values for the weighting elements of baseband weighting and combining arrangements incorporated within multi-antenna transmitter arrangements.

The method of the present invention may also be used to facilitate weight generation in a multiple-input-multiple-output (MIMO) communication system having a transmitter operative to broadcast a number (N) of spatially-multiplexed signals (using at least N transmit antennas). In this case the receiver includes a number (M) of receive antennas that is greater than the number N of spatially-multiplexed signals. In order to effect RF-based weighting, the received signals are split, weighted and combined at RF using frequency-independent weights to form a set of N output signals, each of which is fed to a corresponding RF chain for processing at baseband. The inventive method thus permits the output bit error rate to be minimized in multi-antenna systems with temporal/frequency domain processing using low cost RF weighting.

In order to facilitate appreciation of the principles of the invention, an overview is provided of exemplary architectures for implementing weighting and combining within such multi-antenna systems. This overview is followed by a detailed description of the inventive method of weight generation, which may be applied within the context of such weighting and combining schemes.

Overview of System Architecture

The first of the above-referenced non-provisional patent applications discloses a method and apparatus for use in a wireless communication system which permits a smaller number of RF chains to be used within a transmitter and/or receiver than the number of transmit/receiver antennas utilized. In an exemplary implementation of the disclosed system within a spatially-multiplexed MIMO communication arrangement, a number (N) of RF chains are used in support of N-fold spatial multiplexing.

In the disclosed system, the signal provided by each of M (M>N) antennas of a receiver is passed through a low noise amplifier and then split, weighted and combined in the RF domain with the signals from the other antennas of the receiver. This forms N RF output signals, which are then passed through N RF chains. In this exemplary implementation each RF chain includes a filter, downconverter, and A/D converter. The output signals produced by the A/D converter of each RF chain are then digitally processed to generate the N spatially-multiplexed output signals. By performing the requisite weighting and combining at RF using relatively inexpensive components, an N-fold spatially-multiplexed system having more than N receive antennas, but only N RF chains, can be realized at a cost similar to that of a system having N receive antennas. That is, receiver performance may be improved through use of additional antennas at relatively low cost.

A similar technique can be used at a transmitter incorporating N RF chains and more than N transmit antennas. Specifically, in the exemplary embodiment the N RF chains are followed by RF splitters, weighting elements and combiners collectively operative to generate signals for each of the more than N transmit antennas. As at the receiver, by performing such weighting and combining in the RF domain using relatively inexpensive components, an N-fold spatially-multiplexed system having more than N transmit antennas, but only N RF chains, can be realized at a cost similar to that of a system having N transmit antennas. That is, transmitter performance may be improved through use of additional antennas at relatively low cost.

The reduced-complexity antenna arrangement and receiver disclosed in the first above-referenced non-provisional patent application is premised on performing, within the RF domain, some or all of the weighting and combining operations necessary for spatially-multiplexed communication. These operations may be performed using a plurality of RF chains within each transmitter/receiver that are fewer in number than the number of transmit/receive antennas deployed.

Spatial Multiplexing

As is known, spatial multiplexing (SM) provides a mode of signal transmission predicated upon the use of multiple antennas at both a transmitter and a receiver in such a way that the bit rate of a wireless radio link may be increased without correspondingly increasing power or bandwidth consumption. In the case in which N antennas are used at both a transmitter and a receiver, an input stream of information symbols provided to the transmitter is divided into N independent substreams. Spatial multiplexing contemplates that each of these substreams will occupy the same "channel" (e.g., time slot, frequency, or code/key sequence) of the applicable multiple-access protocol. Within the transmitter, each substream is separately applied to the N transmit antennas and propagated over an intervening multipath communication channel to a receiver. The composite multipath signals are then received by a receive array of N receive antennas deployed at the receiver. At the receiver, a "spatial signature" defined by the N phases and N amplitudes arising at the receive antenna array for a given substream is then estimated. Signal processing techniques are then applied in order to separate the received signals, which permit the original substreams to be recovered and synthesized into the original input symbol stream. The principles of spatially-multiplexed communication and exemplary system implementations are further described in, for example, "Optimum combining for indoor radio systems with multiple users", by J. H. Winters, IEEE Transactions on Communications, Vol. COM-35, No. 11, November 1987, which is hereby incorporated by reference in its entirety.

Conventional MIMO System

Figure 1B:
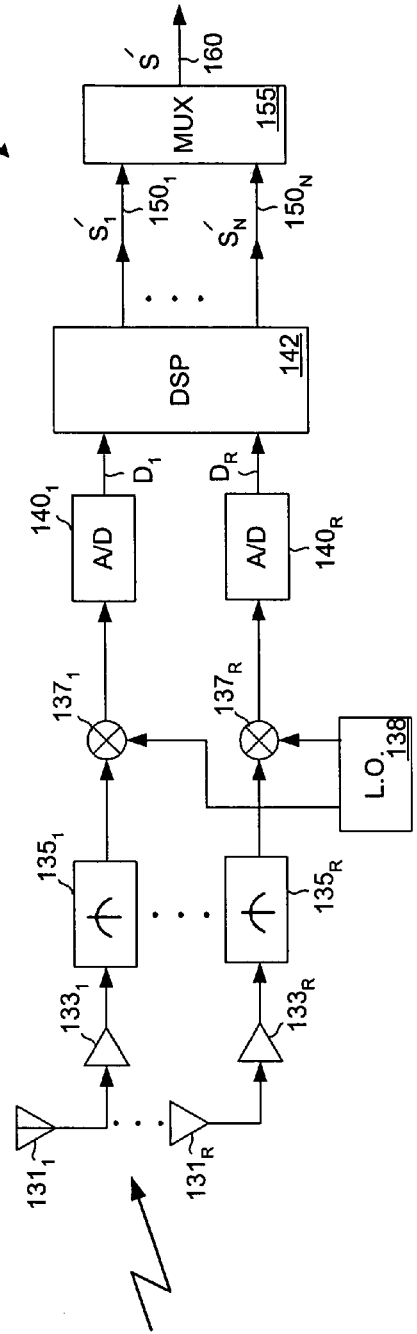

The utility of the weight generation technique of the present invention may be more fully appreciated by first considering a conventional MIMO communication system, which is illustratively represented by FIG. 1. As shown, the MIMO system 100 of FIG. 1 includes a transmitter 110 depicted in FIG. 1A and a receiver 130 depicted in FIG. 1B. The transmitter 110 and receiver 130 include a set of T transmit RF chains and a set of R receive RF chains, respectively, which are configured to transmit and receive a group of N spatially-multiplexed signals. Within the system 100 it is assumed that either (i) T is greater than N and R is equal to N, (ii) T is equal to N and R is greater than N, or (iii) both T and R are greater than N.

Referring to FIG. 1A, an input signal S to be transmitted, which typically consists of a stream of digital symbols, is demultiplexed by demultiplexer 102 into N independent substreams $S_{1, 2, \ldots, N}$. The substreams $S_{1, 2, \ldots, N}$ are then sent to digital signal processor (DSP) 105, which generates a set of T output signals $T_{1, 2, \ldots, T}$. The T output signals $T_{1, 2, \ldots, T}$ are typically generated from the N substreams $S_{1, 2, \ldots, N}$ by weighting, i.e., multiplying by a complex number, each of the N substreams $S_{1, 2, \ldots, N}$ by T different weighting coefficients to form NT substreams. These N·T substreams are then combined in order to form the T output signals $T_{1, 2, \ldots, T}$. The T output signals $T_{1, 2, \ldots, T}$ are then converted to T analog signals $A_{1, 2, \ldots, T}$ using a set of T digital-to-analog (D/A) converters 108. Each of the T analog signals $A_{1, 2, \ldots, T}$ is then upconverted to the applicable transmit carrier RF frequency within a mixer 112 by mixing with a signal provided by a local oscillator 114. The resulting set of T RF signals (i.e., $RF_{1, 2, \ldots, T}$) are then amplified by respective amplifiers 116 and transmitted by respective antennas 118.

Referring now to FIG. 1B, the RF signals transmitted by the transmitter 110 are received by a set of R receive antennas 131 deployed at the receiver 130. Each of the R signals received by an antenna 131 is amplified by a respective low noise amplifier 133 and passed through a filter 135. The resultant filtered signals are then each downconverted from RF to baseband using mixers 137, each of which is provided with a signal from local oscillator 138. Although the receiver of FIG. 1B is configured as a homodyne receiver, a heterodyne receiver characterized by an intermediate IF frequency could also be used. The respective R baseband signals produced by the mixers 137 are then converted to digital signals using a corresponding set of R analog-to-digital (A/D) converters 140. The resulting R digital signals $D_{1, 2, \ldots, R}$ are then weighted and combined using digital signal processor 142 to form N spatially-multiplexed output signals $S'_{1, 2, \ldots, N}$, which comprise estimates of the transmitted signals $S_{1, 2, \ldots, N}$. The N output signals $S'_{1, 2, \ldots, N}$ are then multiplexed using a multiplexer 155 in order to generate an estimate 160 (S') of the original input signal S.

RF Weighting and Combining in
Spatially-Multiplexed Communication Systems

Turning now to FIG. 2, there is shown a block diagram of a MIMO communication system 200 having a transmitter 210 and receiver 250 configured in accordance with the principles of the first above-referenced non-provisional patent application. In the implementation of FIG. 2 the transmitter 210 and receiver 250 effect N-fold spatial multiplexing using only N transmit/receive RF chains, even though more than N transmit/receive antennas are respectively deployed at the transmitter 210 and receiver 250. Specifically, the transmitter 210 includes a set of MT transmit antennas 240 and the receiver includes a set of MR receive antennas 260, it being assumed that either (i) MT is greater than N and MR is equal to N, (ii) MT is equal to N and MR is greater than N, or (iii) both MT and MR are greater than N.

As shown in FIG. 2A, an input signal S to be transmitted is demultiplexed by demultiplexer 202 into N independent substreams $SS_{1, 2, \ldots, N}$. The substreams $SS_{1, 2, \ldots, N}$ are then converted to N analog substreams $AS_{1, 2, \ldots, N}$ using a corresponding set of D/A converters 206. Next, the N analog substreams $AS_{1, 2, \ldots, N}$ are upconverted to the applicable transmit carrier RF frequency using a set of mixers 212 provided with the signal produced by a local oscillator 214. The resultant N RF signals (i.e., $RF_{1, 2, \ldots, N}$) are then each split MT ways by dividers 218 in order to form N·(MT) RF signals. These N·(MT) RF signals are each weighted using complex multipliers $226_{x,y}$, where x identifies a signal origination point at one of the N dividers 218 and y identifies a corresponding signal termination point at one of a set of MT combiners 230. The weighted RF signals are combined using the combiners 230, thereby yielding a set of MT output signals. A corresponding set of MT amplifiers 234 then amplify these MT output signals, with the amplified output signals then being transmitted using the MT antennas 240. The weighting values of the complex multipliers $226_{x,y}$ may be generated so as to minimize the bit error rate of the output signal at the receiver.

Referring to FIG. 2B, the MT RF signals transmitted by the transmitter 210 are received by the set of MR receive antennas 260 deployed at the receiver 250. Each of the MR received signals is amplified by a respective low noise amplifier 264 and then split N ways by one of a set of MR dividers 268. The resulting MR·(N) split signals are then each weighted by respective weighting circuits $272_{x,y}$, where x identifies a signal origination point at one of the MR dividers 268 and y identifies a corresponding signal termination point at one of a set of N combiners 276. These weighted signals are then combined using the N combiners 276 in order to form a set of N signals, which are passed through a corresponding set of N filters 280. The resulting N filtered signals are then downconverted to baseband using a set of N mixers 282, each of which is provided with a carrier signal produced by a local oscillator 284. Although the receiver 250 is realized as a homodyne receiver in the embodiment of FIG. 2B, it could also be implemented as a heterodyne receiver characterized by an intermediate IF frequency. The N baseband signals produced by the mixers 282 are then converted to digital signals via a corresponding set of N A/D converters 286. The N digital signals are then further processed using digital signal processor 288 to form the N spatially-multiplexed output signals $SS'_{1, 2, \ldots, N}$, which are the estimates of the N independent substreams $SS_{1, 2, \ldots, N}$. The N output signals $SS'_{1, 2, \ldots, N}$ are then multiplexed via a multiplexer 292 in order to generate the output signal S', which is an estimate of the input signal S.

It is observed that the transmitter 210 and receiver 250 are capable of implementing, within the RF domain, the same spatial weighting or linear combining schemes as are conventionally implemented at baseband via the system 100 of FIG. 1. However, the DSP 288 within the inventive receiver 250 may still perform many other baseband signal processing operations potentially effected within the system 100, such as, for example, successive interference cancellation (see, e.g., "V-BLAST: An architecture for realizing very high data rates over the rich-scattering wireless channel", *Proceedings of URSI ISSSE*, September 1998, pp. 295-300). Again, it is a feature of the disclosed system that only N transmit/receive RF chains need be employed, even when substantially more than N transmit/receive antennas are deployed.

The inventive weight generation technique has applicability to, for example, (i) receivers using multiple antennas in what are referred to herein as single channel (SC) systems (i.e., systems lacking spatial multiplexing), (ii) transmitters using multiple antennas in single channel systems, and (iii) systems in which a smaller number of RF chains are used at the transmitter and/or receiver than the number of transmit/receiver antennas in a MIMO system with spatial multiplexing.

Although the weight generation techniques described herein may be utilized in the development of RF-based weighting and combining schemes implemented using low-cost RF components, the teachings of the present invention are equally applicable to implementations containing both RF-based and baseband weighting and combining arrangements. Accordingly, both RF-based and baseband weighting and combining schemes are described hereinafter. In this regard various implementations using the weighting techniques of the invention may include only RF weighting and combining schemes while others contemplate use of both RF and baseband weighting and combining schemes. In general, it is expected that weighting and combining consistent with the description herein may be more economically performed in the RF domain than at baseband, but that implementations including both RF-based and baseband combining arrangements may in certain cases offer superior performance results.

Weight Generation Method for RF Weighting and Combining Based on Minimum Bit Error Rate In accordance with one aspect of the present invention, the weighting values or "weights" used during the RF-based weighting and combining process described herein are selected so as to maximize the output signal-to-noise ratio of the applicable multi-antenna system. In general, the embodiments described below are configured such that the signals received by multiple antennas are weighted and combined at RF using a single frequency-independent weight for each antenna. In an exemplary embodiment a single frequency-independent weight is defined such that the weight coefficients are constant over a given channel domain, including the frequency bandwidth, the tap delay profile, the time impulse response, and the Rake fingers profile. The weight generation method of the invention enables calculation of the weights that minimize the bit error rate of the output signal. Furthermore, the method of the invention can also be used for weight generation at the transmitter when multiple antennas are used for transmission, with the transmitted signal split and weighted at RF using a single frequency-independent weight for each transmit antenna.

As is described in further detail below, in one embodiment of the invention it is contemplated that the weighting values or "weights" be determined by searching over a weight space to find a set of weights which minimize the applicable bit error rate (BER). This can be done by a global search, i.e., by searching over a set of quantized weight values within the weight space and choosing a set which minimizes the BER. Since the BER will often be a complicated function of a given set of weights, a unique approximation of the BER for a given set of weights which varies with the coding and modulation method employed may instead be utilized in certain embodiments. In addition, simulated annealing may be used in other embodiments in order to speed the process of finding the optimum weights that minimize the approximated BER described above.

Exemplary Scenarios

The weight generation techniques of the present invention will be described hereinafter with reference to the exemplary scenarios illustratively represented by FIGS. 3-9. Specifically, the weight generation methods will be explained within the context of the following three scenarios: 1) a receiver using multiple antennas in a single channel SIMO system without spatial multiplexing, 2) a transmitter using multiple antennas and a receiver using multiple antennas in a single channel MIMO system without spatial multiplexing, and 3) a system whereby a smaller number of RF chains are used at the transmitter and/or receiver than the number of transmitter/receiver antennas in a MIMO system with spatial multiplexing. It is noted that the present invention may also find application in the context of a multi-antenna transmitter operative in a single channel (SC) multiple-input single output (MISO) system without spatial multiplexing. Again, embodiments of the invention can be implemented with exclusively RF-based weighting and combining arrangements, as well as with both RF-based and baseband arrangements.

For illustrative purposes, many of the following examples are described with reference to systems utilizing OFDM modulation; however, the application of the invention to an exemplary system based upon a direct sequence spread spectrum (DS-SS) is also possible. In a DS-SS system, the receiver can be extended to include the spatial domain in the form of a space-time Rake receiver. Such a receiver is operative to combine the multi-path taps in the temporal and spatial domains. This extension illustrates that the techniques described herein may be generalized to virtually any system employing temporal/frequency domain processing in a frequency-selective fading environment.

Figure 3:
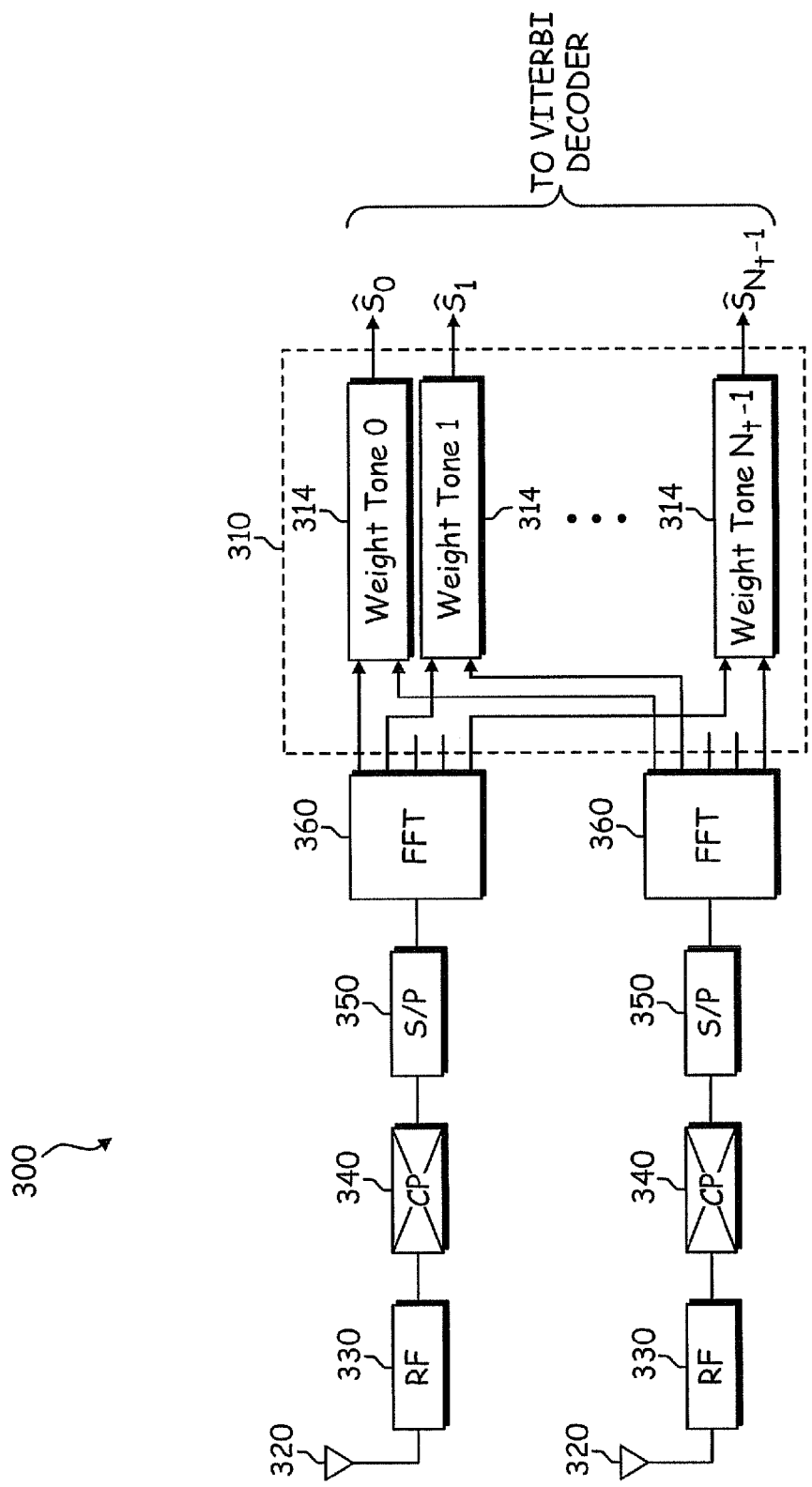
FIG. 3 depicts a receiver structure in a single-channel (SC) single-input-multiple-output (SIMO)-OFDM system in the case in which a baseband combining arrangement is used.

FIG. 3 depicts a receiver structure 300 in a SC-SIMO system in the case in which a baseband combining arrangement 310 is used. Consistent with the invention, a substantially similar baseband combining arrangement may be incorporated within a SC-SIMO receiver structure which also contains an RF-based weighting and combining arrangement (see, e.g., FIG. 4). In this way a portion of the requisite weighting and combining is performed within the RF domain and the balance at baseband.

In the receiver structure 300 of FIG. 3, the values of the baseband weighting elements 314 are computed over both space and frequency. In addition, exemplary implementations of the receiver structure of FIG. 3 adhere to the requirements of the 802.11a standard, which requires processing of received signals transmitted using OFDM modulation techniques. Consistent with this approach, a stream of $N_t$ consecutive quadrature amplitude modulation (QAM)-modulated data symbols, denoted by $\{s_0, s_1, \ldots, s_{N_t-1}\}$ is modulated onto a set of $N_t$ orthogonal subcarriers, see, e.g., J. Heiskala and J. Terry, OFDM Wireless LANs: A Theoretical and Practical Guide, Sams Publishing, December 2001. Within the receiver 300, the signal received at each antenna element 320 is demodulated and down-converted from RF to baseband within RF chain 330. Then the cyclic prefix (CP), which was added at the transmitter to mitigate inter-symbol interference (ISI), is removed 340. The symbols, via a serial-to-parallel conversion 350, are then mapped to the subcarriers of a 64-point fast Fourier transform (FFT) 360.

In a noise-limited scenario, the reconstructed data signal at the output of the FFT 360 of the $i^{th}$ receive antenna element 320 for the $k^{th}$ tone is given by $$r_{i,k} = H_i\left(e^{j\frac{2\pi}{N_t}k}\right) \cdot s_k + n_{i,k} \tag{1.}$$

where H is the channel frequency response of the L-tap channel impulse response denoted by $\{h_0, h_1, \ldots, h_{L-1}\}$ and n is complex-valued additive white Gaussian noise (AWGN) with zero-mean and variance $\sigma^2$. The relationship between frequency-domain H and time-domain h is:

$$H\left(e^{j\frac{2\pi}{N_t}k}\right) = \sum_{l=0}^{L-1} h_l e^{-j\frac{2\pi}{N_t}lk} \tag{2.}$$

The received signals from each antenna element 320 are collected in an M-dimensional vector, where M is the number of receive antenna elements. The received vector at tone k becomes:

$$\underline{r}_k = \underline{H}_k \cdot s_k + \underline{n}_k \tag{3.}$$

where $\underline{r}_k = [r_{1,k}, r_{2,k}, \ldots r_{M,k}]^T$, $$\underline{H}_k = [H_1(e^{j\frac{2\pi}{N_t}k}), H_2(e^{j\frac{2\pi}{N_t}k}), \ldots, H_M(e^{j\frac{2\pi}{N_t}k})]^T$$

and $\underline{n}_k=[n_{1,k}, n_{2,k}, \ldots n_{M,k}]^T$ are all M-dimensional vectors.

The received vector is multiplied at each tone by an M-dimensional weight vector $\underline{w}_k$. The resulting output signal at tone k is given by $$y_k = \underline{w}_k^H \cdot \underline{r}_k = \underline{w}_k^H \underline{H}_k \cdot s_k + \underline{w}_k^H \underline{n}_k \quad (4)$$

The corresponding output signal-to-noise ratio (SNR) at tone k is $$SNR_k = \frac{\sigma_s^2}{\sigma^2} \frac{\underline{w}_k^H \underline{H}_k \underline{H}_k^H \underline{w}_k}{\underline{w}_k^H \underline{w}_k} \quad (5.)$$

where $\sigma_s^2 = E[s_k s_k^*]$ and $\sigma^2 = E[n_k n_k^*]$ are considered constant over the frequency domain.

In a noise-limited scenario, the weight minimizing the output bit error rate (which is also the weight that maximizes the output SNR) at tone k is:

$$\underline{w}_k = \underline{H}_k / \|\underline{H}_k\|^2 \quad (6.)$$

The corresponding output signal $y_k$ becomes $$y_k = \hat{s}_k = s_k + \frac{\underline{H}_k^H}{\|\underline{H}_k\|^2} \underline{n}_k$$

where $y_k$ corresponds to the estimate of the data symbol transmitted on tone k.

The corresponding maximum output SNR is then $$SNR_{max,k} = \frac{\sigma_s^2}{\sigma^2} \|\underline{H}_k\|^2 \quad (7.)$$
$$= \frac{\sigma_s^2}{\sigma^2} \sum_{i=1}^{M} \left|H_i(e^{j\frac{2\pi}{N_t}k})\right|^2$$

This corresponds to the Maximum Ratio Combining (MRC) solution, where the output SNR at tone k is the sum of the individual SNR received at each antenna element at tone k. Consistent with the invention, the output bit error rate is also minimized through solution of Equation (6).

It is observed that the use of linear combining weights can lead to channel noise enhancement. Whenever a convolutional encoder is used at the transmitter, the information about the output noise on each individual sub-carrier should be incorporated into the Viterbi algorithm used at the receiver to provide significant performance improvement in fading channels, as shown in J. Heiskala and J. Terry, OFDM Wireless LANs: A Theoretical and Practical Guide, Sams Publishing, December 2001. Specifically, each "soft" bit entering the Viterbi decoder is weighted by a factor that is inversely proportional to the "enhanced" noise, such noise being a function of the sub-carrier channel on which the soft bit was transmitted. This adjustment allows the convolutional decoder to apply different weights to the information it receives from different tones. In this way the contribution of the information from tones experiencing poor channel conditions may be diminished by the weighting, while the contribution of information from tones experiencing favorable channel conditions may be augmented. Such variable weighting is expected to result in improved performance under frequency-varying conditions.

The computation of the metric weighting used in Viterbi decoding proceeds as follows:

The error signal at tone k is expressed as:

$$e(k) = s_k - \underline{w}_k^H \cdot \underline{r}_k = s_k(1 - \underline{w}_k^H \underline{H}_k) - \underline{w}_k^H \cdot \underline{n}_k \quad (8.)$$

The mean squared error (MSE)—or post-combining noise variance—is thus $$\Sigma_H = E|e(k)|^2 = E|s_k|^2 (1 - \underline{w}_k^H \cdot \underline{H}_k)(1 - \underline{H}_k^H \cdot \underline{w}_k) + \sigma^2 \underline{w}_k^H \underline{w}_k \quad (9.)$$

$$\Sigma_H = \sigma_s^2(1 - \underline{H}_k^H \cdot \underline{w}_k - \underline{w}_k^H \cdot \underline{H}_k + \underline{w}_k^H \cdot \underline{H}_k \underline{H}_k^H \cdot \underline{w}_k) + \sigma^2 \underline{w}_k^H \underline{w}_k \quad (10.)$$

With $\underline{w}_k = \underline{H}_k / \|\underline{H}_k\|^2$ from (6), then $\Sigma_H = \sigma^2 / \|\underline{H}_k\|^2$.

Since $\sigma^2$ is assumed to be constant over the frequency bandwidth, it can be ignored without affecting the performance of the Viterbi decoder. The metrics weighting (MW), denoted by MW(k), are then $$\Sigma'_H = 1/\|\underline{H}_k\|^2; \quad MW(k) = 1/\Sigma'_H = \|\underline{H}_k\|^2 \quad (11.)$$

Each bit composing the symbol $s_k$ is weighted by MW(k).

In summary, the present exemplary scenario contemplates that a different weight be computed at each tone, based on the knowledge of the channel frequency response at the tone, so as to maximize the output SNR at the tone (and thereby minimizing the output bit error rate). Unfortunately, straightforward implementation of this approach results in incurring the expense of dedicating one RF chain to each receive antenna.

The next exemplary scenario considered is one in which the spatial received signals are combined in the RF domain such that only a single RF chain need be used. This approach advantageously minimizes costs within the applicable user equipment. As is discussed below, the weighting element values are derived consistent with the present invention using this approach by minimizing the output bit error rate.

Figure 4:
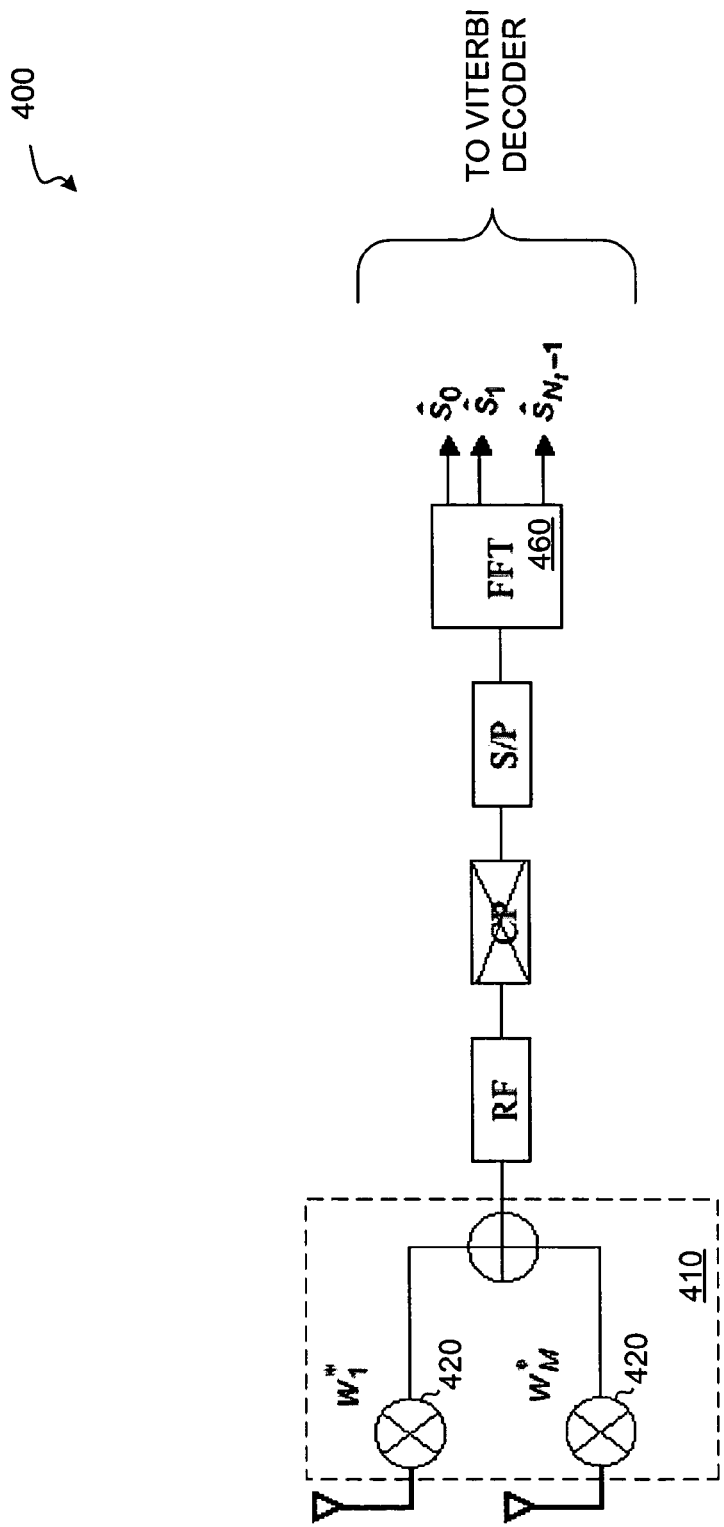
FIG. 4 depicts the receiver structure in a SC-SIMO-OFDM system in the case in which an RF-based weighting and combining network is employed.

FIG. 4 depicts a receiver structure 400 in a SC-SIMO system in the case in which an RF-based weighting and combining network 410 is employed. In this case the weights 420 may be defined by a one-dimensional vector that is common to all tones. The computation of the weights 420 may be carried out in baseband, in which case the values of the weights 420 are fed back to the RF domain via an internal bus.

As mentioned previously, in alternate implementations the RF-based weighting and combining arrangement within the receiver structure 400 may be complemented by a baseband weighting and combining arrangement. This results in a portion of the requisite weighting and combining being performed in the RF domain and the balance being effected at baseband.

In the configuration depicted in FIG. 4, the output of the FFT 460 at tone k is given by $$y_k = w^H \cdot \underline{r}_k = w^H \underline{H}_k \cdot s_k + w^H \underline{n}_k \quad (12.)$$

where w is an M-dimensional vector which no longer depends on the subscript k.

Based on (12), the output SNR at tone k is $$SNR_k = \frac{\sigma_s^2}{\sigma^2} \frac{w^H \underline{H}_k \underline{H}_k^H w}{w^H w} \quad (13.)$$

The bit error rate (BER) over the packet, at the output of the Viterbi decoder, can be expressed as some non-linear, unknown function $f$ of the set of $SNR_k$, k=1, ..., $N_t$, i.e., $$\overline{BER} = f(\{SNR_k\}) \quad (14.)$$

$$= f\left(\left\{\frac{\sigma_s^2 w^H H_k H_k^H w}{\sigma^2 w^H w}\right\}\right)$$

In the present case it is desired to find the optimal weight vector w that minimizes $\overline{BER}$.

One manner in which the optimal value of w may be determined is through a blind search. In particular, the BER is computed for each possible value of w, the computed values of BER are plotted as a function of w, and the minimum BER is identified. In certain embodiments three different types of blind searches may be effected:

1. Equal Gain Combining (EGC) coarse search: This search assumes that the vector coefficients of w are composed of phases only (amplitudes are all ones). The search is carried out over all possible combinations of phases for w, with a quantized coarse step search of X degrees.
2. Coarse Linear Search: This search is carried out in two consecutive steps. Specifically, the minimizing set of phases are initially determined under the condition of unity amplitude. Once this set of phases has been identified, a search over amplitude is conducted. The quantization steps employed during the phase and amplitude searches may be denoted by X degrees and Y, respectively.
3. Fine 2D Global Search: This search yields the most accurate solution for w but is generally also the most computationally extensive. In particular, a search is conducted for the minimizing weight solution over a two-dimensional grid covering all possible phases and amplitudes. Equivalently, the search may alternately be carried over the real and imaginary part of each coefficient. Computation may be expedited by executing the search in three stages. During the first stage a coarse resolution (quantization step of Y for both real and imaginary part) is utilized, while the two other stages converge towards the solution with improved resolution (with Z<Y and W<Z<Y quantization steps). This type of search becomes computationally intensive when the number of receive antennas is greater than two.

The computation time required to find w through such blind searching may be reduced by approximating the function $f$ by some known function. Specifically, the output bit error rate may be approximated by the average of the bit error rate over the channel, i.e., $$\overline{BER} \approx P_E(w) = 1/N_t \sum_{k=1}^{N_t} BER_k \quad (15.)$$

where $BER_k$ is the bit error rate given the SNR at tone k. Of course, in other embodiments $BER_k$ may instead comprise the bit error rate given the signal-to-interference-plus-noise ratio at tone k. It is also observed that the averaging required in the expression for the output BER approximated by (15) may be effected in the time domain, in which case $BER_k$ is the bit error rate given the SNR at channel time sample k. That is, $BER_k$ is the bit error rate with respect to a given signal component (e.g., a signal tone or tap delay).

In order to further enhance computational efficiency, $BER_k$ may be approximated by a closed-form expression. For example, in simulations based upon mode 1 of the 802.11a standard (i.e., BPSK, R1/2), it has been found that the behavior of the average bit error rate $\overline{BER}$ with respect to w can be well modeled by:

$$\overline{BER} \approx P_E(w) = -\sum_{k=1}^{N_t} \tanh(SNR_k) \quad (16.)$$

where the BER normalization factor $1/N_t$ has been dropped, since it does not affect the weight calculation. The BER at signal component k has thus been approximated by— tan h $(SNR_k)$, which enables the optimal weight to be expressed as:

$$w_{MBER} = \underset{w}{\operatorname{argmin}}\left(-\sum_{k=1}^{N_t} \tanh(SNR_k)\right) \quad (17.)$$

$$= \underset{w}{\operatorname{argmin}}\left(-\sum_{k=1}^{N_t} \tanh\left(\frac{\sigma_s^2 w^H H_k H_k^H w}{\sigma^2 w^H w}\right)\right)$$

In the case of the interference-limited scenario, the output signal-to-interference-plus-noise ratio (SINR) at tone k is given by:

$$SINR_k = \frac{\sigma_s^2 w^H H_k H_k^H w}{w^H R_{v,k} w} \quad (18.)$$

where $R_{v,k}$ is the noise-plus-interference correlation matrix. Assuming that tan h is still an acceptable function to reproduce the BER behavior with respect to w, the minimum BER criterion becomes:

$$w_{MBER} = \underset{w}{\operatorname{argmin}}\left(-\sum_{k=1}^{N_t} \tanh(SINR_k)\right) \quad (19.)$$

$$= \underset{w}{\operatorname{argmin}}\left(-\sum_{k=1}^{N_t} \tanh\left(\frac{\sigma_s^2 w^H H_k H_k^H w}{w^H R_{v,k} w}\right)\right)$$

Figure 5:
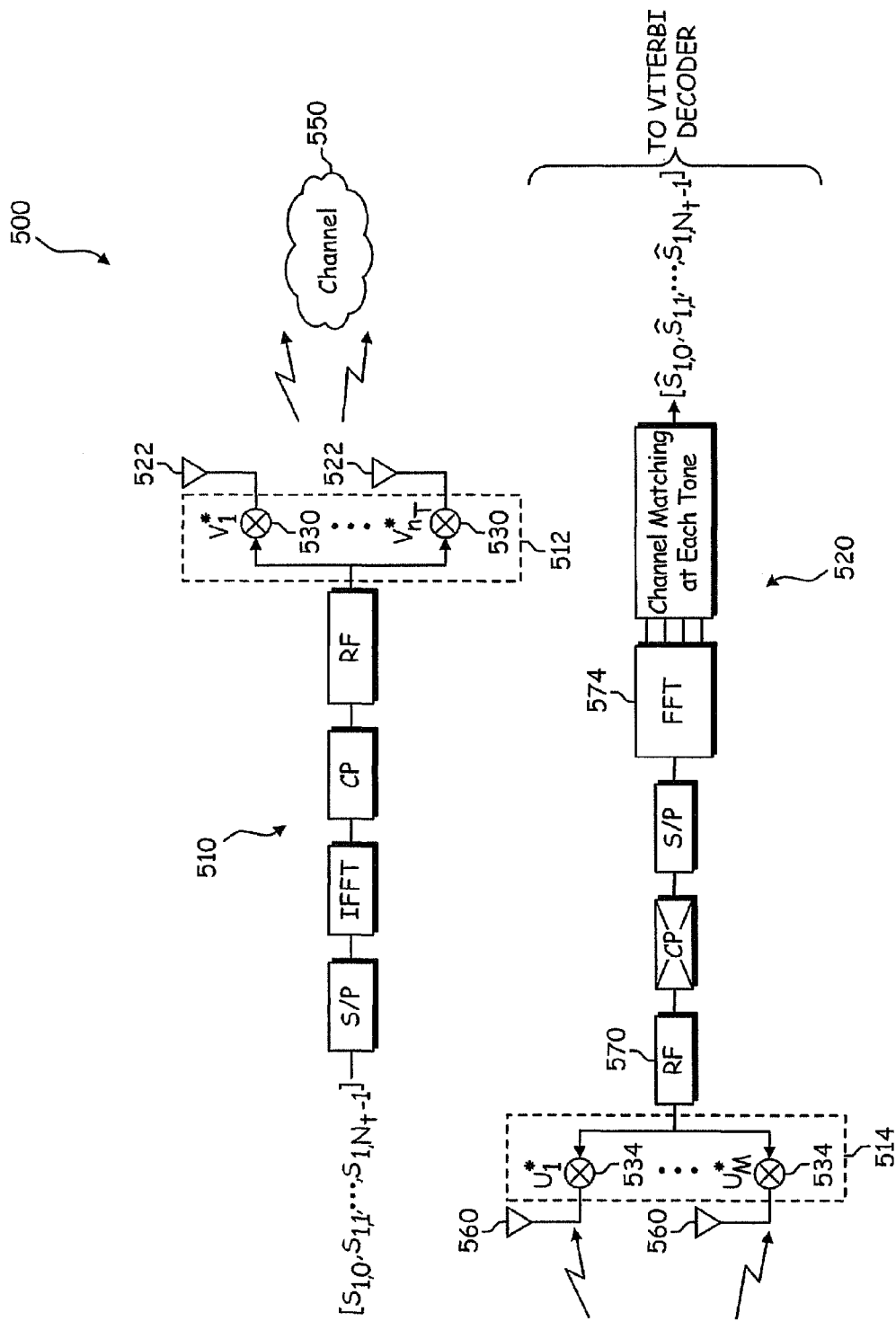
FIG. 5 illustratively represents the transmitter and receiver structure of a SC-MIMO-OFDM system utilizing an RF weighting and combining arrangement.

FIG. 5 illustratively represents the transmitter 510 and receiver 520 of a SC-MIMO-OFDM system 500 utilizing RF weighting and combining arrangements 512 and 514, respectively. The transmitter 510 of the system 500 is composed of $n_T$ transmit antenna elements 522, each of which conveys a weighted version of the same data sub-stream and uses OFDM modulation. The combining weights 530 in the present exemplary case are implemented using RF-based elements capable of being defined by a single vector, which advantageously permits an implementation incorporating only a single RF transmit chain. At the receiver 520, the combining weights 534 are also implemented at RF as a single vector, and the combined received signal is then passed through a single RF chain 570 for demodulation.

In alternate implementations the RF-based weighting and combining arrangements 512. 514 within the transmitter 510 and receiver 520 of FIG. 5 may be complemented by baseband weighting and combining arrangements. This results in a portion of the requisite weighting and combining being performed in the RF domain and the balance being effected at baseband.

In the configuration of FIG. 5, the transmit signal at tone k out of the $j^{th}$ antenna is $$txs_{j,k} = v_j \cdot s_{1,k} \quad (20.)$$

The transmit vector at tone k is $$\underline{txs}_k = \underline{v} \cdot s_{1,k} \quad (21.)$$

The transmit weights can thus be viewed as an $n_T \times 1$ vector, which preferably is a function of the propagation channel 550. However, it is not a function of the channel frequency selectivity, as it is common to all tones. As the total transmit power is kept equal to P, it follows that:

$$E[s_{1,k} s_{1,k}^*] = P/n_T = \sigma_s^2 \quad (22.)$$

Then the constraint on the transmit weight vector 530 is expressed as $$\mathrm{trace}(\underline{v}\underline{v}^H) = \underline{v}^H \underline{v} = \|\underline{v}\|^2 = P/\sigma_s^2 = n_T \quad (23.)$$

The signal propagates through the channel 550 and the received signals from each antenna element 560 of the receiver 520 are collected in an M-dimensional vector. The received vector at tone k becomes:

$$\underline{r}_k = H_k \cdot \underline{v} \cdot s_{1,k} + \underline{n}_k \quad (24.)$$

The received vector is multiplied at RF by an $M \times 1$ receive weight vector denoted by u and physically realized by weighting elements 534. It is then passed through an RF chain 570 for demodulation and downconversion. The combined received signal at the output of the FFT 574 can thus be written as:

$$y_k = \hat{s}_{1,k} = \underline{u}^H \cdot \underline{r}_k = \underline{u}^H H_k \cdot \underline{v} \cdot s_{1,k} + \underline{u}^H \underline{n}_k \quad (25.)$$

where $y_k$ is the estimate of $s_{1,k}$. The corresponding output SNR at tone k is:

$$SNR_k = \frac{(\underline{u}^H H_k \cdot \underline{v})^2 E[s_{1,k} s_{1,k}^*]}{\sigma^2 \|\underline{u}\|^2} \quad (26.)$$

$$= \frac{(\underline{u}^H H_k \cdot \underline{v})^2 P/n_T}{\sigma^2 \|\underline{u}\|^2}$$

In the case of the SC-MIMO-OFDM system, the approximation of the average BER given in (16) is still valid for mode 1 of 802.11a (BPSK, R1/2). Thus, the optimal transmit and receive weights v and u satisfy $$\{\underline{u}_{MBER}, \underline{v}_{MBER}\} = \underset{\underline{u},\underline{v}}{\mathrm{argmin}} \left( -\sum_{k=1}^{N_t} \tanh(SNR_k) \right) \quad (27.)$$

$$= \underset{\underline{u},\underline{v}}{\mathrm{argmin}} \left( -\sum_{k=1}^{N_t} \tanh\left( \frac{(\underline{u}^H H_k \cdot \underline{v})^2 \sigma_s^2}{\sigma^2 \|\underline{u}\|^2} \right) \right)$$

Figure 6:
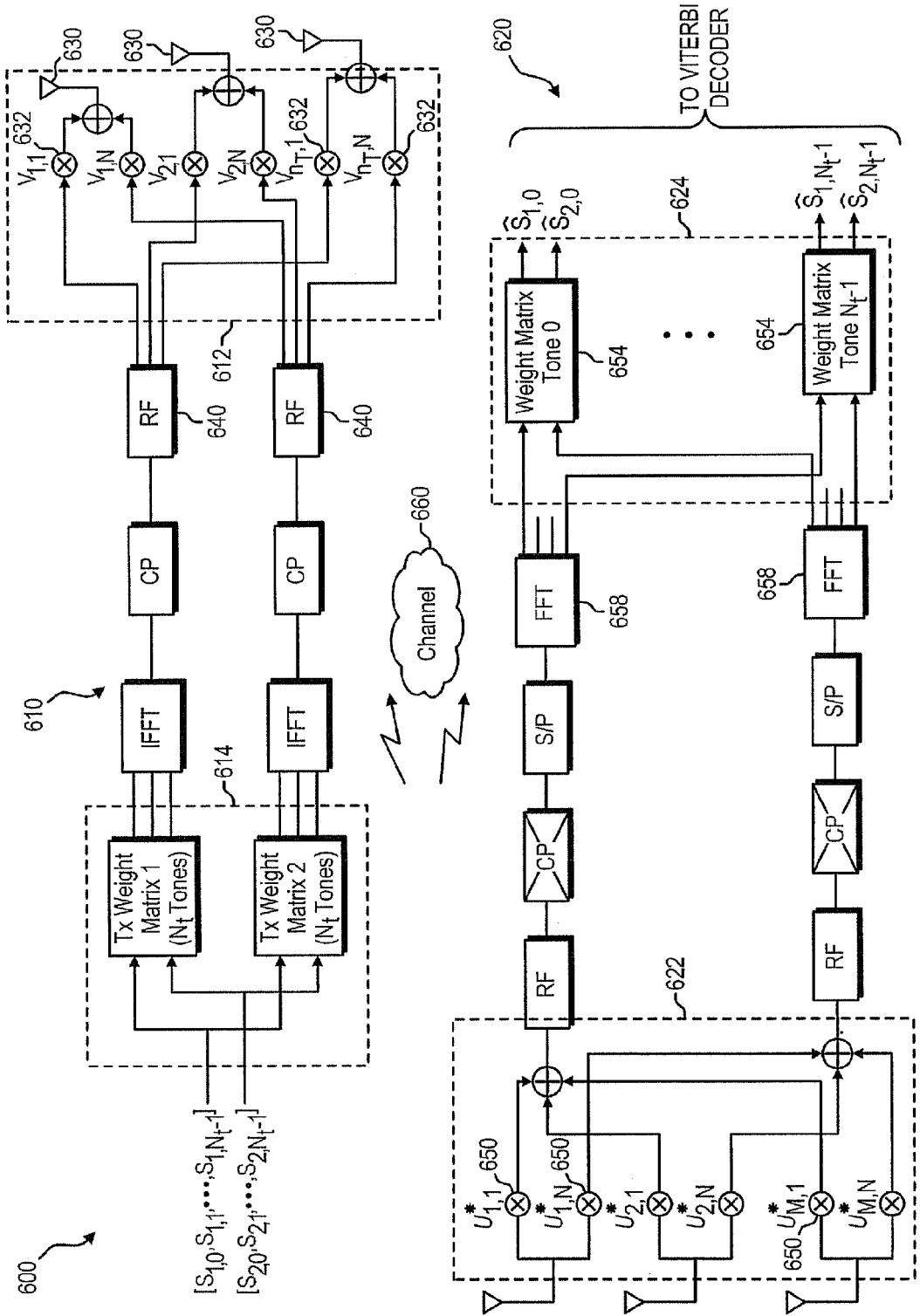
FIG. 6 illustratively represents a transmitter and a receiver structure of a SM-MIMO-OFDM system which includes both RF-based and baseband weighting and combining arrangements.

FIG. 6 illustratively represents a communication system 600 including a transmitter 610 and a receiver 620, each of which includes both RF-based and baseband weighting and combining arrangements. Specifically, the transmitter 610 includes an RF weighting and combining arrangement 612 and a baseband weighting and combining arrangement 614, and the receiver 620 includes an RF weighting and combining arrangement 622 and a baseband weighting and combining arrangement 624. As shown, the transmitter 610 is composed of $n_T$ transmit antenna elements 630, each of which conveys a weighted combination of N distinct sub-streams (i.e. spatially-multiplexed signals) and uses OFDM modulation.

Since at least a portion of the combining weights are realized as RF elements 632 within the transmitter 610, the number of transmit RF chains 640 is advantageously reduced to the number of spatially-multiplexed signals. This type of an arrangement is believed to permit cost-effective implementation.

In the configuration of FIG. 6, the transmit signal at tone k from the $j^{th}$ antenna 630 is:

$$txs_{j,k} = \sum_{i=1}^{N} v_{j,i} \cdot s'_{i,k} \quad (28.)$$

where $$s'_{i,k} = \sum_{l=1}^{N} v'_{i,l,k} \cdot s_{l,k} \quad (29.)$$

and where the terms v and v' represent the RF and baseband weights, respectively. The transmit vector at tone k is $$\underline{txs}_k = V \cdot V'_k \cdot \underline{s}_k \quad (30.)$$

where V is the transmit RF weight matrix of size $n_T \times N$ and is independent of the index k (as it is constant over the frequency tones), and where $V'_k$ is the transmit baseband weight matrix of size $N \times N$ and is dependent upon on the index k (as it is a function of frequency).

In order to simplify the above example, it is assumed that $V'_k$ is equal to the identity matrix at each tone. It is to be understood that in other embodiments, $V'_k$ can be a matrix other than the identity matrix. For example, when $V'_k$ is dependent upon the channel, various "precoding" methods and the like can assist in the computation of $V'_k$ given a specific criterion to optimize. In this case, the transmit vector at tone k becomes $$\underline{txs}_k = V \cdot \underline{s}_k = \sum_{i=1}^{N} \underline{v}_i \cdot s_{i,k} \quad (31.)$$

To preserve the total transmit power, the constraint on the matrix V is written as:

$$\mathrm{trace}(V^H V) = n_T \quad (32.)$$

assuming that $$\sigma_s^2 = E[s_{i,k} s_{i,k}^*] = P/n_T, \, i=1, \ldots, N \quad (33.)$$

Once the transmitted signal has propagated through the applicable channel 660 and has been received, the received vector at tone k is given by:

$$\underline{r}_k = H_k \cdot V \cdot \underline{s}_k + \underline{n}_k \quad (34.)$$

As mentioned above, the receiver 620 of FIG. 6 also utilizes distinct RF and baseband weighting and combining arrangements. Specifically, a first set of weights 650 for the RF-based arrangement 622 are implemented at RF and are common to all tones, while a second set of weights 654 are utilized within the baseband arrangement 624. Note that the step of computing the RF weights 650 may also be carried out in baseband, in which case the values of the weights 650 are fed back to the RF domain via an internal bus, creating a feedback delay. In this configuration, the received vector is multiplied in the RF domain by a M×N matrix U. The resulting output signal at tone k is given by $$\underline{y}_k = U^H \cdot \underline{r}_k = U^H H_k \cdot V \cdot \underline{s}_k + U^H \underline{n}_k \quad (35.)$$

Expression (35) can also be written as:

$$\underline{y}_k = H_k'' \cdot \underline{s}_k + \underline{\eta}_k \quad (36.)$$

where $H_k'' = U^H H_k \cdot V$ and $\underline{\eta}_k = U^H \underline{n}_k$.

The N×1 vector $\underline{y}_k$ is converted into baseband and processed with one additional set of weights so as to separate and recover the several spatially-multiplexed signals. The final output signal is $$\underline{z}_k = W_k^H \underline{y}_k = W_k^H H_k'' \cdot \underline{s}_k + W_k^H \underline{\eta}_k \quad (37.)$$

Consistent with the invention, it is desired to derive optimal solutions for V, U, and $W_k$ in order to minimize the BER of the applicable output signal. As stated earlier, the BER of the output signal is a function of the output SNR or, in the case of spatially-multiplexed systems, of the output SINR. The output signal corresponding to the $i^{th}$ spatially-multiplexed signal at tone k is:

$$z_{k,i} = \underline{w}_{k,i}^H \underline{y}_k \quad (38.)$$
$$= \underline{w}_{k,i}^H U^H H_k \cdot V \cdot \underline{s}_k + \underline{w}_{k,i}^H U^H \underline{n}_k$$

$$z_{k,i} = \underline{w}_{k,i}^H U^H H_k \cdot \underline{v}_i \cdot s_{i,k} + \underline{w}_{k,i}^H U^H \left( \sum_{j \neq i} H_k \cdot \underline{v}_j \cdot s_{j,k} + \underline{n}_k \right) \quad (39.)$$

The corresponding output SINR is:

$$SINR_{i,k} = \frac{\sigma_s^2 \underline{w}_{k,i}^H U^H H_k \cdot \underline{v}_i \underline{v}_i^H H_k^H U \underline{w}_{k,i}}{\sigma_s^2 \sum_{j \neq i} \underline{w}_{k,i}^H U^H H_k \cdot \underline{v}_j \underline{v}_j^H H_k^H U \underline{w}_{k,i} + \sigma^2 \underline{w}_{k,i}^H U^H U \underline{w}_{k,i}} \quad (40.)$$

In the case of the SM-MIMO-OFDM system, the approximation of the average BER given in (16) is still valid for mode 1 of the 802.11a standard (i.e., BPSK, R1/2). Accordingly, for the $i^{th}$ spatially-multiplexed signal $$\overline{BER}_i \approx P_E(U, V) = -\sum_{k=1}^{N_t} \tanh(SINR_{i,k}) \quad (41.)$$

where $SINR_{i,k}$ is given by (40).

In certain embodiments a numerical search (e.g., simulated annealing) is employed in order to search over all possible values of U and V so as to minimize the average output BER. For each combination of U and V, the value of $W_k$ is calculated, for example, as the MMSE solution, i.e., $$W_k = (H_k'' R_{s,k} H_k''^H + R_{\eta,k})^{-1} H_k'' R_{s,k} \quad (42.)$$
where
$$R_{s,k} = \sigma_s^2 I_N$$
and
$$R_{\eta,k} = E[\underline{\eta}_k \underline{\eta}_k^H] = \sigma^2 U^H U, \text{ thus}$$

$$W_k = \left( H_k'' H_k''^H + \frac{\sigma^2}{\sigma_s^2} U^H U \right)^{-1} H_k'' \quad (43.)$$

Then, for each triplet of values for U, V, $W_k$, the SINR can be computed for each tone and each spatially-multiplexed signal according to (40). Finally a set of N estimated BER values is obtained from (41); that is, one estimate is computed for each spatially-multiplexed signal.

Several approaches may then be used to minimize the average output BER. For example, the mean over the set of BERs may be minimized, the maximum over such set may be minimized, or the minimum of the set may be identified. These approaches are mathematically represented as follows:

$$\min_{U,V} \left\{ \operatorname*{mean}_{i=1,\dots,N} \{BER_i\} \right\}$$

$$\min_{U,V} \left\{ \min_{i=1,\dots,N} \{BER_i\} \right\}$$

$$\min_{U,V} \left\{ \max_{i=1,\dots,N} \{BER_i\} \right\}$$

Although each of these approaches could conceivably be employed in various embodiments, it has been found that the last approach above has lead to the most favourable results.

Figure 7:
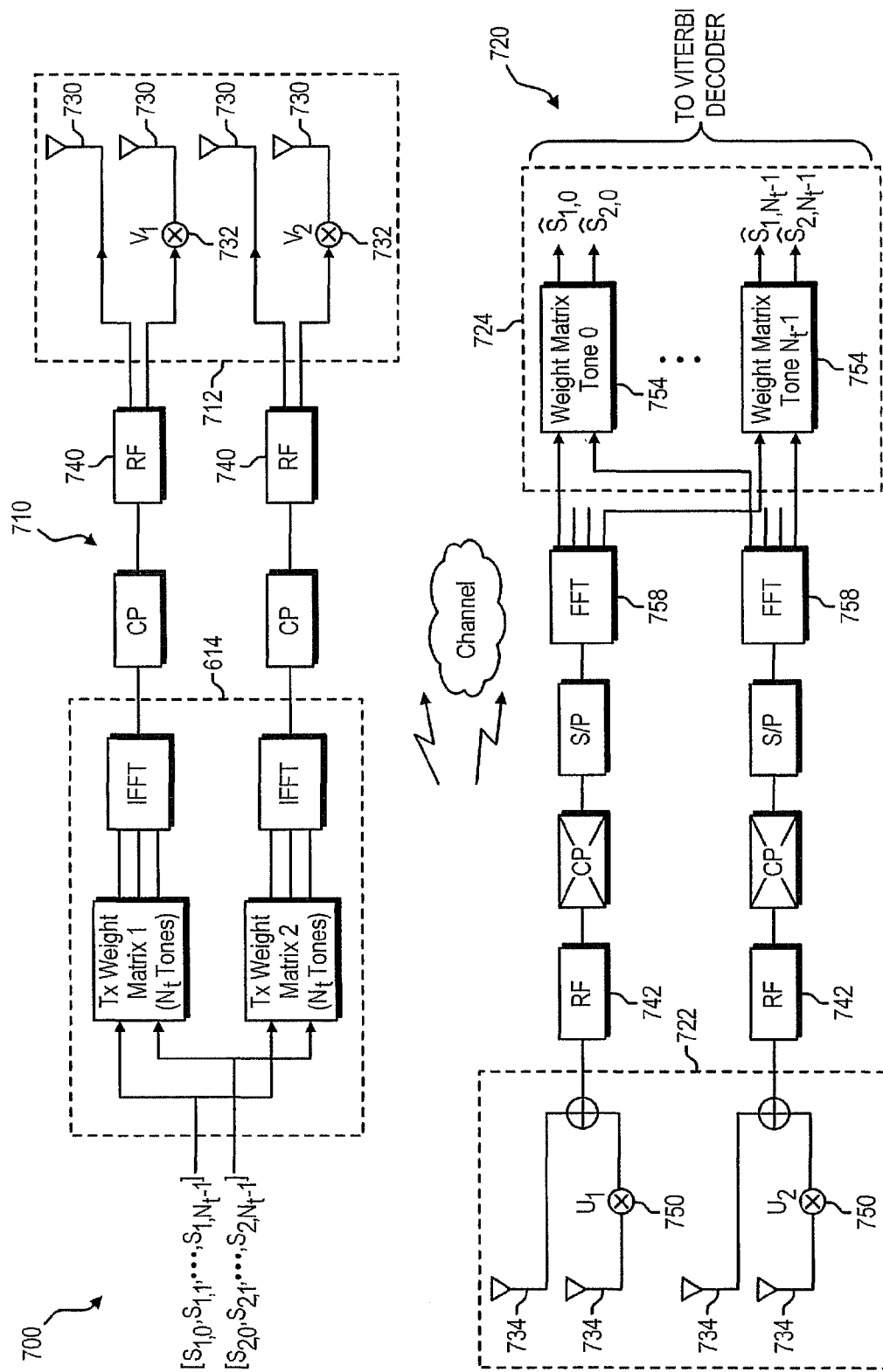
FIG. 7 illustratively represents a transmitter and a receiver structure of a SM-MIMO-OFDM system which each include both a paired single-weight RF-based weighting and combining arrangement and a baseband weighting and combining arrangement.

FIG. 7 illustratively represents a communication system 700 effectively comprising a simplified version of the communication system 600 represented in FIG. 6. The system 700 includes a transmitter 710 and a receiver 720, each of which includes both RF-based and baseband weighting and combining arrangements. Specifically, the transmitter 710 includes an RF weighting and combining arrangement 712 and a baseband weighting and combining arrangement 714, and the receiver 720 includes an RF weighting and combining arrangement 722 and a baseband weighting and combining arrangement 724. As shown, the transmitter 710 is composed of $n_T=4$ transmit antenna elements 730, each of which conveys a weighted combination of N=2 distinct sub-streams (i.e. spatially-multiplexed signals) and uses OFDM modulation.

The system 700 may be characterized as a paired single-weight ("paired SW") system, since a pair of antenna elements 730 in the transmitter 710 and a pair of antenna elements 734 in the receiver 720 are each connected to a single RF chain. This approach affords the system 700 the performance advantages associated with multi-antenna implementations while even further reducing cost and implementation complexity relative to the system represented in FIG. 6. Indeed, for the exemplary case in which four antenna elements 730 are deployed at the transmitter 710 and four antenna elements 734 are likewise deployed at the receiver 720 so as to support communication of two spatially-multiplexed signals, only two RF weight coefficients 732 are required at the transmitter 710 and only two RF weight coefficients 750 are required at the receiver 720 (i.e., a total of four weighting coefficients are utilized within the system 700). In contrast, a similar four-antenna implementation in the system of FIG. 6 requires a total of six RF weight coefficients at each of the transmitter and receiver; that is, in this case the system of FIG. 6 would utilize a total of twelve RF weight coefficients. It is noted that the foregoing assumes that at least one weight coefficient has been normalized to unity in each of the transmitters and receivers of the systems of FIGS. 6 and 7.

The reduced number of RF weights required by the system 700 directly translates into a less costly and simplified implementation.

In the configuration of FIG. 7, the transmit signal at tone k from the $j^{th}$ antenna 730 is:

$$txs_{j,k} = \sum_{i=1}^{N} v_{j,i} \cdot s'_{i,k} \qquad (44.)$$

where $$s'_{i,k} = \sum_{l=1}^{N} v'_{i,l,k} \cdot s_{l,k} \qquad (45.)$$

and where the terms v and v' represent the RF and baseband weights, respectively. The transmit vector at tone k is $$\underline{txs}_k = V \cdot V'_k \underline{s}_k \qquad (46.)$$

where V is the transmit RF weight matrix of size $n_T \times N$ and is independent of the index k (as it is constant over the frequency tones), and where $V'_k$ is the transmit baseband weight matrix of size N×N and is dependent upon on the index k (as it is a function of frequency).

As a consequence of the dedication of a pair of antennas to a single RF chain within the paired SW system 700, the structure of V is given as:

$$V = \begin{bmatrix} v_a & 0 \\ v_b & 0 \\ 0 & v_c \\ 0 & v_d \end{bmatrix} \qquad (47.)$$

such that the pair of antennas indexed by i sends a signal containing contributions only of $s'_{i,k}$. If the columns in V are normalized by their first coefficient, the structure of V becomes:

$$V = \begin{bmatrix} 1 & 0 \\ v_1 & 0 \\ 0 & 1 \\ 0 & v_2 \end{bmatrix} \qquad (48.)$$

In order to simplify the above example, it is considered that $V'_k$ is equal to the identity matrix at each tone. It is to be understood that in other embodiments, $V'_k$ can be a matrix other than the identity matrix. For example, when $V'_k$ is dependent upon the channel, various "precoding" methods and the like can assist in the computation of $V'_k$ given a specific criterion to optimize. To simplify further, consider that V is equal to:

$$V = \begin{bmatrix} 1 & 0 \\ 0 & 0 \\ 0 & 1 \\ 0 & 0 \end{bmatrix} \qquad (49.)$$

In other words, the transmitter 710 has been simplified such that only two of four antennas 730 are used and each such antenna 730 transmits its own spatially-multiplexed signal, i.e., the transmit vector at tone k becomes $$\underline{txs}_k = \underline{s}_k \qquad (50.)$$

where $txs_k$ is a N×1 vector. It is to be understood that in other embodiments, V can be given by the general expression (48).

As mentioned above, the receiver 720 of FIG. 7 also utilizes distinct RF and baseband weighting and combining arrangements. Specifically, a first set of weights 750 for the RF-based arrangement 722 are implemented at RF and are common to all tones, while a second set of weights 754 are utilized within the baseband arrangement 724. Note that the step of computing the RF weights 750 may also be carried out in baseband, in which case the values of the weights 750 are fed back to the RF domain via an internal bus, creating a feedback delay.

In this configuration, the received signal vector (following RF combining) at tone k, $\underline{r}_k$, becomes of dimension N×1 and may be expressed as:

$$\underline{r}_k = U^H(H_k \cdot \underline{s}_k + \underline{n}_k) = U^H H_k \cdot \underline{s}_k + U^H \underline{n}_k \qquad (51.)$$

where $U = [\underline{u}_1, \ldots, \underline{u}_N]$ is an M×N matrix containing the set of weights implemented at RF with the specific structure:

$$U = \begin{bmatrix} u_a & 0 \\ u_b & 0 \\ 0 & u_c \\ 0 & u_d \end{bmatrix} \qquad (52.)$$

After normalization, U becomes:

$$U = \begin{bmatrix} 1 & 0 \\ u_1 & 0 \\ 0 & 1 \\ 0 & u_2 \end{bmatrix} \qquad (53.)$$

Expression (51) can also be written as:

$$\underline{r}_k = H_k'' \cdot \underline{s}_k + \underline{\eta}_k \qquad (54.)$$

where $H''_k = U^H H_k$ and $\underline{\eta}_k = U^H \underline{n}_k$.

The received vector is then multiplied at each tone k by the complex conjugate of an N×N matrix denoted by $W_k$ so as to enable detection of the transmitted signals. The resulting output signal at tone k is given by:

$$\underline{y}_k = W_k^H \cdot \underline{r}_k = W_k^H H''_k \cdot \underline{s}_k + W_k^H \underline{\eta}_k = W_k^H U^H (H_k \cdot \underline{s}_k + \underline{n}_k) \qquad (55.)$$

It is observed that while the weights $W_k$ are a function of the applicable frequency tone k, the RF weights U are common to all tones.

Consistent with the invention, it is desired to derive optimal solutions for V, U, and $W_k$ in order to minimize the BER of the applicable output signal. In this regard the search for the minimizing weights may be conducted in a substantially similar manner as that described with reference to FIG. 6, with the exception that in the present case the RF weights U and V are of a structure defined by equations (47) and (52). In other words, the search method used in the embodiment of FIG. 7 is essentially the same as that used in the system of FIG. 6, with an additional constraint being placed upon a subset of the coefficients composing matrices U and V (i.e., these coefficients are constrained to zero).

Extension to Other Fitting Functions

It has been found that the tan h function may not always approximate the BER to the desired degree of accuracy, particularly for higher-level modulation techniques. It has also been found that the following functions tend to offer improved performance in the contexts indicated below:

1) The BER of uncoded BPSK modulation in an AWGN channel has been expressed as:

$$BER_{BPSK} = Q\left(\sqrt{\frac{2E_b}{N_o}}\right)$$
$$= Q(\sqrt{2\gamma_b})$$
$$= \frac{1}{2}\text{erfc}(\sqrt{\gamma_b})$$
$$= \frac{1}{2}\text{erfc}(\sqrt{\gamma_s}).$$

See, e.g., J. G Proakis, *Digital Communications*, 3$^{rd}$ Ed. McGraw-Hill Series, 1995. The shape of the function erfc has been found to be more accurately approximated by the following function than by y=−tan h(x):

$$y=-[(1-e^{-2\sqrt{x}})+(1-e^{-1.8x})]/2.$$

2) The BER of the uncoded QPSK modulation in AWGN channel is given by:

$$BER_{QPSK} = Q\left(\sqrt{\frac{2E_b}{N_o}}\right)$$
$$= Q(\sqrt{2\gamma_b})$$
$$= \frac{1}{2}\text{erfc}(\sqrt{\gamma_b})$$
$$= \frac{1}{2}\text{erfc}\left(\sqrt{\frac{\gamma_s}{2}}\right).$$

See, e.g., J. G Proakis, *Digital Communications*, 3$^{rd}$ Ed. McGraw-Hill Series, 1995. The shape of erfc($\sqrt{x/2}$) is better approximated by the function: y=−[(1−e$^{-1.3\sqrt{x}}$)+(1−e$^{-x}$)]/2 than by y=−tan h(x).

3) The BER of the uncoded 16 QAM modulation in AWGN channel may be derived from the symbol error rate (SER) and is given as $$BER_{16QAM} = 1 - \sqrt{1 - \frac{3}{2}Q\left(\sqrt{\frac{3E_s}{15N_o}}\right)}$$
$$= 1 - \sqrt{1 - \frac{3}{4}\text{erfc}\left(\frac{\gamma_s}{10}\right)}$$

See, e.g., J. G Proakis, *Digital Communications*, 3$^{rd}$ Ed. McGraw-Hill Series, 1995. In this regard an appropriate fitting function is y=−(1−e$^{-0.2x}$)/2.

4) The BER of the uncoded 64 QAM modulation in AWGN channel may be derived from the symbol error rate (SER) and is expressed as:

$$BER_{64QAM} = 1 - \left(1 - \frac{7}{4}Q\left(\sqrt{\frac{\gamma_s}{21}}\right)\right)^{1/3}$$
$$= 1 - \left(1 - \frac{7}{8}\text{erfc}\left(\sqrt{\frac{\gamma_s}{42}}\right)\right)^{1/3}$$

See, e.g., J. G Proakis, *Digital Communications*, 3$^{rd}$ Ed. McGraw-Hill Series, 1995. An appropriate fitting function is y=−(1−e$^{-0.35\sqrt{x}}$)/2.

It is observed that any added constants appearing in the above-described fitting functions may be discarded in the approximation expression, as such constants do not affect the computation of the applicable weights.

Furthermore, it is observed that Equation (14) (or, equivalently, Equations (19), (27), (41)), from which the optimal weight vector w that minimizes $\overline{BER}$ may be derived, cannot be solved analytically (even with recourse to the approximation functions set forth above). Since performance of a blind search is computationally intensive, particularly for more than two antennas, a numerical method may be utilized to search and converge towards the weight solution w that minimizes the BER. If the function to be minimized has no local minima, the well-known gradient steepest-descent algorithm may be used (see, e.g., S. Haykin, *Adaptive Filter Theory*, 3$^{rd}$ Ed. Prentice Hall, 1996). However, the function to be minimized does indeed include local minima. In this case, more computationally intensive methods are required, such as the simulated annealing method (see, e.g., W. H. Press et al., *Numerical recipes in C*, 2$^{nd}$ Ed. Cambridge University Press, 1992, and S. Kirkpatrick et al., 'Optimization by Simulated Annealing," *Science*, Vol. 220, No. 4598, 13 May 1983, pp. 671-680).

Although the algorithm for simulated annealing is well known and widely available, a significant challenge in implementing simulated annealing in the present context involves selecting a schedule for the search that is appropriate for the application in which it is being used. In this regard a trade-off exists between accuracy of the solution and convergence speed. As described in detail in S. Szykman et al., "Improving the Efficiency of Simulated Annealing Optimization Through Detection of Productive Search", *Proceedings of DECT'97*, Sep. 14-17 1997, Sacramento, Calif., selection of an annealing schedule involves determination of the initial temperature, the number of iterations performed at each temperature, how and when the temperature decreases, and the algorithm termination condition. In a particular preferred embodiment, the following scheduling parameters for the annealing algorithm are employed:

temperature=1
    nsteps=100 (number of iterations at each temperature)
    tfactor=0.9 (rate at which the temperature decreases)
    bound=10^−2 (termination condition on the value of the function to minimize)
    var-bound=10^−3 (termination condition on the value of the variance of the function to minimize).

It has been found that utilization of this annealing schedule has resulted in convergence with reasonable accuracy and speed. In other implementations it may be desired to improve accuracy by changing certain of the above parameters, generally at the cost of increased consumption of computing resources.

Several examples are set forth below in order to illustrate the performance of simulated annealing in the context of the present invention.

Example 1

SC SIMO OFDM System

Figure 8A:
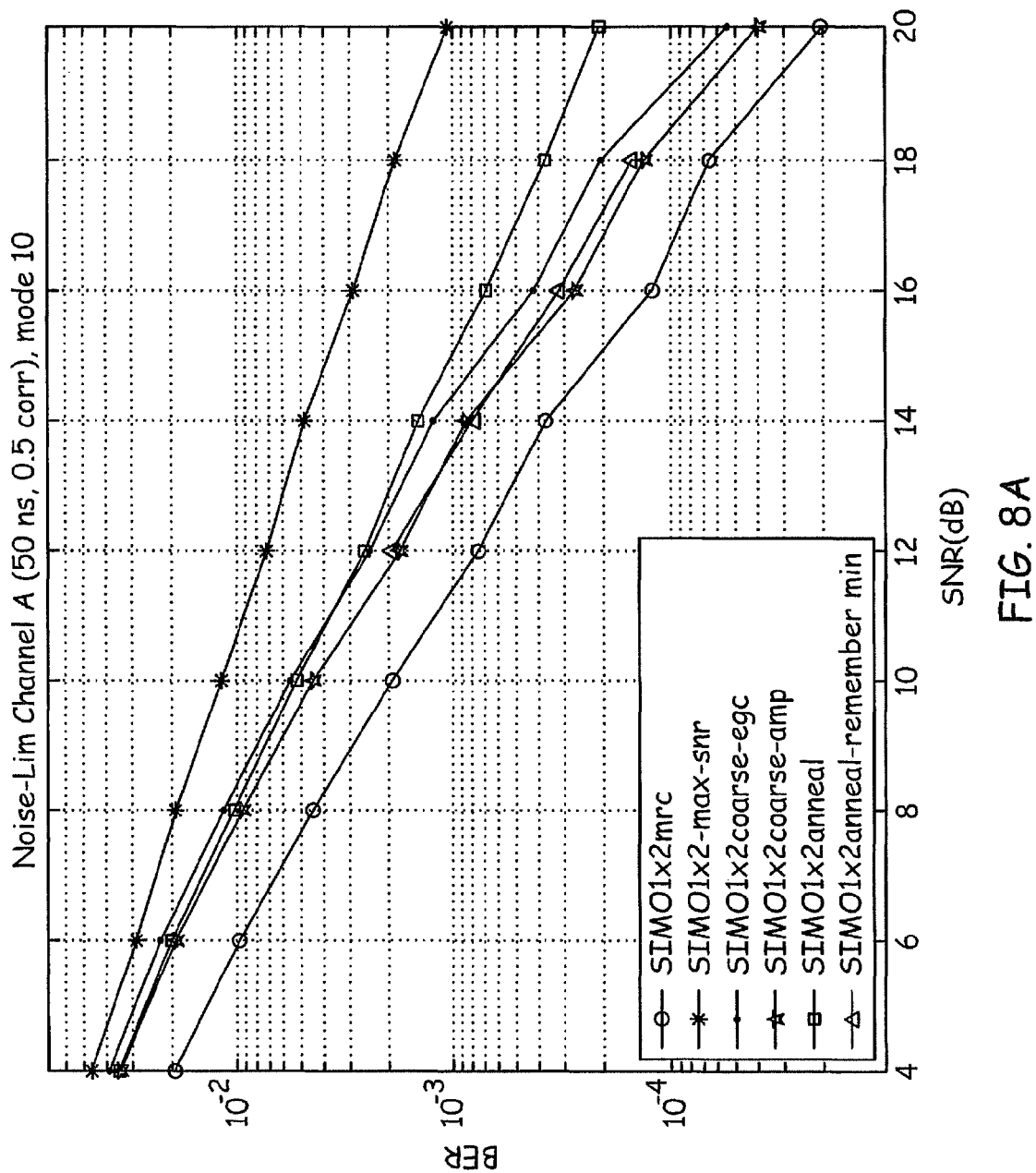
FIGS. 8A and 8B illustratively represent comparative performance bit error rate (BER) and packet error rate (PER), respectively, as a function of signal-to-noise ratio (SNR) for an uncoded operative mode of a SIMO-OFDM system.
Figure 8B:
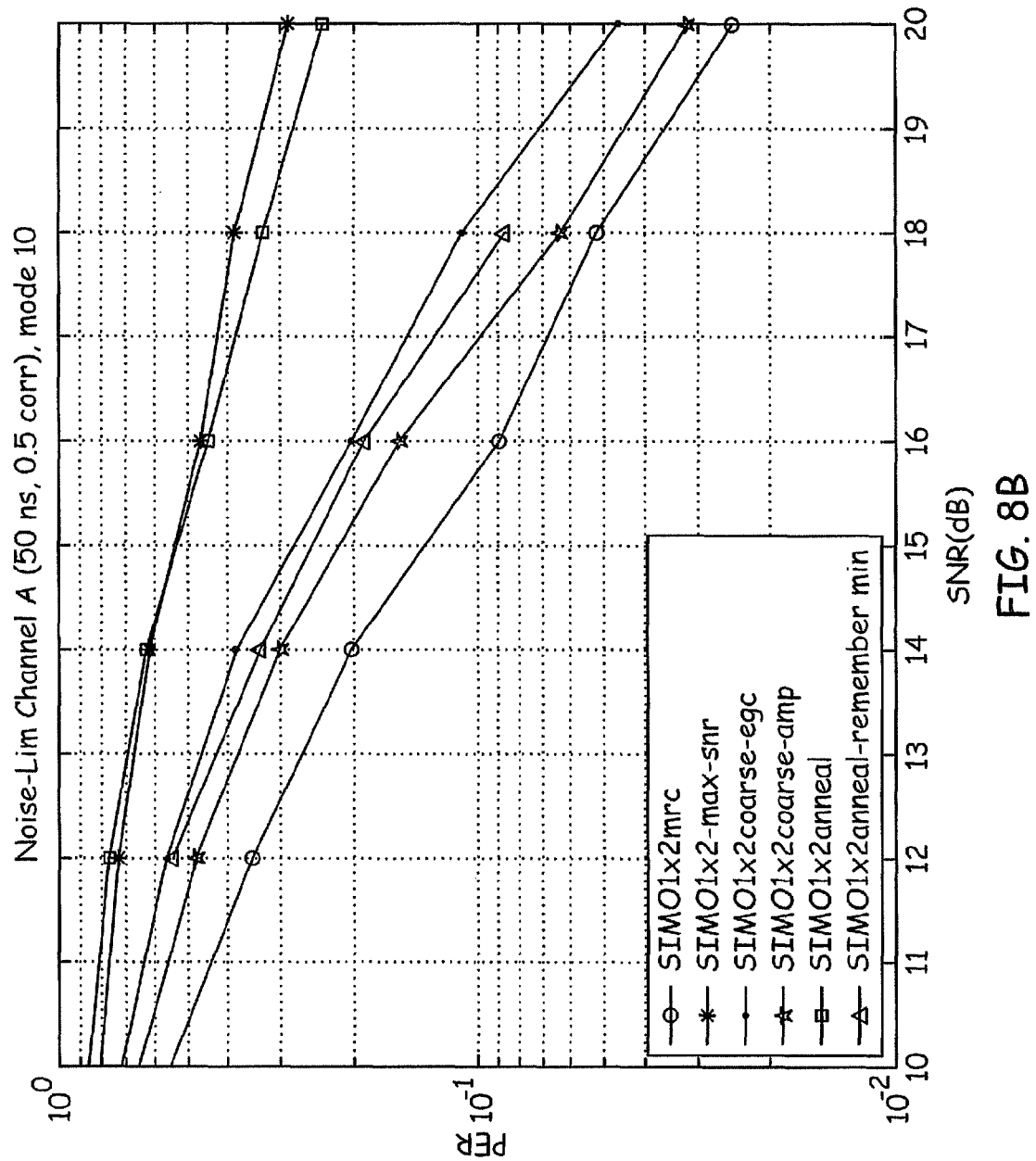

As a first example, a SIMO OFDM system in a noise-limited environment using one transmit antenna and two receive antenna elements is considered. The resulting BER and packet error rate (PER) curves as a function of signal-to-noise ratio (SNR) are represented in FIGS. 8A and 8B, respectively. The results of FIGS. 8A and 8B are predicated upon the use of BPSK modulation and no coding (i.e., "mode 10"), a channel model "A" (50 ns rms delay spread, 0.5 antenna correlation), and a fitting function of tan h to approximate the applicable BER.

As shown, two curves representative of two different cases of simulated annealing are presented in FIGS. 8A and 8B. Specifically, "SIMO1×2anneal" represents a search based upon simulated annealing using a fitting function of tan h. "SIMO1×2anneal-remember-min" is the same search but the solution that minimizes the BER is stored at each iteration. That is because there is some randomness associated with simulated annealing, and it can leave an optimal solution and not find it again, so it is important to store at each iteration the best solution found so far and overwrite it only if a better solution is found.

Storing the best solution can make a substantial difference in terms of performance, mainly for the PER of uncoded modulations. FIG. 8B shows that at PER=10% the gain provided by "SIMO1×2anneal-remember-min" is close to 10 dB over the solution that does not store the minimum.

A description of the system and weight computation approach corresponding to each of the curves in FIGS. 8A and 8B is given below:

SIMO1×2-mrc: This curve corresponds to a SC-SIMO system in the case in which a baseband combining arrangement is used, i.e., one weight per each tone (MRC).

SIMO1×2-max-snr: This curve corresponds to a SC-SIMO system in the case in which an RF-based weighting and combining network is employed. A single frequency-independent weight combines the received signals at RF, where the weight solution is computed to maximize the average output SNR in a manner consistent with that described in the above non-provisional application Ser. No. 10/835,255.

SIMO1×2-coarse-egc: This curve corresponds to a SC-SIMO system in the case in which an RF-based weighting and combining network is employed. A single frequency-independent weight combines the received signals at RF, where the weight solution is computed to minimize the average BER. The weight coefficients consist of phases only (EGC). At each channel realization, we perform a blind search over phases to minimize the BER with a coarse quantization step of X=18 deg.

SIMO1×2-coarse-amp: This curve corresponds to a SC-SIMO system in the case in which an RF-based weighting and combining network is employed. A single frequency-independent weight combines the received signals at RF, where the weight solution is computed to minimize the average BER. The weight coefficients consist of both amplitude and phase. At each channel realization, we perform a linear search over phases first (every step X=18 deg), and then amplitude (within range [0, 2.5] with Y=0.125 step) to minimize the BER.

SIMO1×2-anneal: This curve corresponds to an SC-SIMO system in the case in which an RF-based weighting and combining network is employed. A single frequency-independent weight combines the received signals at RF, where the weight solution is computed to minimize the average BER. At each channel realization, simulated annealing searches and converges towards the weight solution (both amplitude and phase) that minimizes the BER approximation given in (16).

SIMO1×2-anneal-remember min: This curve corresponds to the same system and approach as is represented by the SIMO1×2-anneal curve, but in this case the best solution is stored within the loop of simulated annealing and overwritten only if a better solution is found.

The results of FIG. 8 indicate that using RF weights that minimize the average output BER results in a significantly lower BER than using RF weights which maximize the average output SNR. In addition, these results indicate that although employment of a global search solution may result in better results relative to the case in which a coarse search solution and simulated annealing are employed, use of these less computationally intensive techniques may nonetheless lead to acceptable performance.

Example 2

SC MIMO OFDM System

Figure 9:
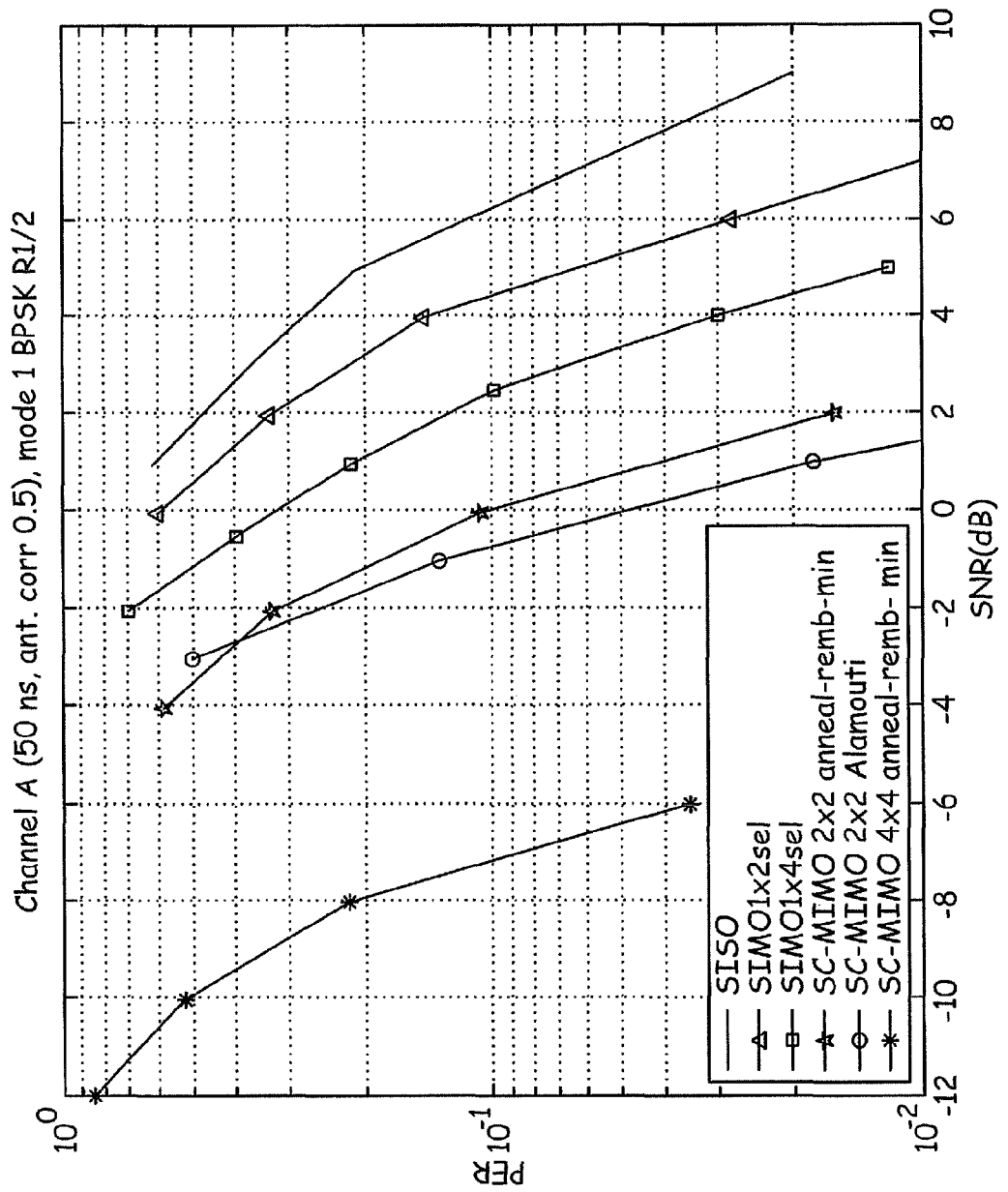
FIG. 9 illustratively represents comparative performance PER as a function of SNR for a coded operative mode of a SC-MIMO-OFDM system.

FIG. 9 illustratively represents the PER performance as a function of SNR for an n×n SC MIMO OFDM system operative within a noise-limited environment. Results are shown both for the case of n=2 and n=4. The results of FIG. 9 assume the use of BPSK modulation, and a coding rate of ½ (i.e., mode 1 of 802.11a standard). It is further assumed that a channel model characterized as "channel A" (i.e., 50 ns rms delay spread, 0.5 antenna correlation) is utilized, and that the fitting function is tan h.

A description of the system and weight computation approach corresponding to each of the curves in FIG. 9 is given below:

SISO: This curve corresponds to a single-input single output system using only one antenna at the transmitter and receiver.

SIMO1×2sel: This curve corresponds to a SC-SIMO system where only one receive antenna element is selected among a set of two elements. The selection is made based on the maximum average receive input SNR.

SIMO1×4sel: This curve corresponds to the same system as the previous but contemplates that the selection is made among four, rather than two, receiver elements.

SC-MIMO2×2Alamouti: This curve corresponds to a SC-MIMO system with two transmit and two receive antenna elements in the case in which a baseband combining arrangement is used. The techniques employed to transmit and receive the signal are described in S. M. Alamouti, "A simple transmit diversity technique for wireless communications," *IEEE Journal on Selected Areas in Communications*, vol. 16, No. 8, pp. 1451-1458, October 1998.

SC-MIMO n×n anneal-remb-min: This curve corresponds to a SC-MIMO-OFDM system utilizing an RF weighting and combining arrangement according to the present invention with n transmit and n receive antenna elements. At each channel realization, simulated annealing is employed to find the transmit and receive weights that minimize the average output BER, with storing of the best solution at each iteration. The fitting function used is tan h.

These results of FIG. 9 indicate that SC-MIMO systems provide considerable gains relative to SC-SIMO selection systems. In addition, FIG. 9 illustrates that the SC-MIMO2×2 anneal-remb-min of the present invention suffers very little performance loss relative to the SC-MIMO2×2 Alamouti system while being amenable to a substantially more cost-effective implementation. Indeed, while the former requires only a single RF chain within the transmitter and receiver (i.e., a total of two RF chains), the latter requires two RF chains within both the transmitter and receiver (i.e., for a total of four required RF chains. FIG. 9 also indicates that the use of additional antennas (e.g., a 4×4 system rather than a 2×2 system), provides meaningful gains in terms of SNR.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method for processing communication signals, the method comprising:
   in a receiver and/or a baseband processor coupled to said receiver, said receiver comprising a plurality of antennas, performing functions comprising:
      generating a plurality of RF weighting values based on one or more output bit error rates of said receiver;
      weighting a plurality of spatially-multiplexed RF signals, which are received by said receiver, with said one or more of said generated plurality of RF weighting values, to form a plurality of weighted RF signals;
      combining two or more of said generated plurality of weighted RF signals to form two or more combined RF signals; and
      processing each of said two or more combined RF signals by a different RF processing chain.

2. The method according to claim 1, comprising minimizing said one or more output bit error rates of said receiver by said generation of said plurality of RF weighting values.

3. The method according to claim 1, wherein said generated plurality of weighted RF signals comprises single-weighted RF signals.

4. The method according to claim 1, comprising downconverting said two or more combined RF signals to two or more baseband signals.

5. The method according to claim 4, comprising generating a plurality of baseband weighting values, which are computed jointly with said generated plurality of weighted RF signals.

6. The method according to claim 5, comprising weighing said two or more of said baseband signals with two or more of said generated plurality of baseband weighting values.

7. The method according to claim 1, comprising generating said plurality of weighting values by performing one of:
   a globally searching over a finite number of complex weighting values for a set of weights, which minimizes said one or more output bit error rates;
   globally searching over phases of said finite number of complex weighting values for a set of weights, which minimizes said one or more output bit error rates; and
   a linear search comprising globally searching over phases of said finite number of complex weighting values for generated plurality of RF weighting values, which minimizes said one or more output bit error rates, fixing a phase of said generated plurality of RF weighting values to a corresponding one of said phases, and globally searching over amplitudes of said finite number of complex weighting values for an additional set of weights, which minimizes said one or more output bit error rates.

8. The method according to claim 1, comprising:
   approximating said one or more output bit error rates by a closed-form expression; and
   searching for a set of weights that minimize said closed-form expression.

9. The method according to claim 8, comprising searching for a set of weights that minimize said closed-form expression using a gradient steepest-descent algorithm.

10. A system for processing communication signals, the system comprising:
   one or more circuits for use in a receiver and/or a baseband processor coupled to said receiver, said receiver comprising a plurality of antennas, wherein said one or more circuits are operable to:
      generate a plurality of RF weighting values based on one or more output bit error rates of said receiver;
      weigh a plurality of spatially-multiplexed RF signals, which are received by said receiver, with said one or more of said generated plurality of RF weighting values, to form a plurality of weighted RF signals;
      combine two or more of said generated plurality of weighted RF signals to form two or more combined RF signals; and
      process each of said two or more combined RF signals by a different RF processing chain.

11. The system according to claim 10, wherein said one or more circuits are operable to minimize said one or more output bit error rates of said receiver by said generation of said plurality of RF weighting values.

12. The system according to claim 10, wherein said generated plurality of weighted RF signals comprises single-weighted RF signals.

13. The system according to claim 10, wherein said one or more circuits are operable to downconvert said two or more combined RF signals to two or more baseband signals.

14. The system according to claim 13, wherein said one or more circuits are operable to generate a plurality of baseband weighting values, which are computed jointly with said generated plurality of weighted RF signals.

15. The system according to claim 14, wherein said one or more circuits are operable to weigh said two or more of said baseband signals with one or more of said generated plurality of baseband weighting values.

16. The system according to claim 10, wherein said one or more circuits are operable to generate said plurality of weighting values by performing one of:
   a global search over a finite number of complex weighting values for a set of weights, which minimizes said one or more output bit error rates;

a global search over phases of said finite number of complex weighting values for a set of weights, which minimizes said one or more output bit error rates; and a linear search comprising a global search over phases of said finite number of complex weighting values for generated plurality of RF weighting values, which minimizes said one or more output bit error rates, fixing a phase of said generated plurality of RF weighting values to a corresponding one of said phases, and globally searching over amplitudes of said finite number of complex weighting values for an additional set of weights, which minimizes said one or more output bit error rates.

17. The system according to claim 10, wherein said one or more circuits are operable to:

approximate said one or more output bit error rates by a closed-form expression; and search for a set of weights that minimize said closed-form expression.

18. The system according to claim 17, wherein said one or more circuits are operable to search for a set of weights that minimize said closed-form expression using a gradient steepest-descent algorithm.

* * * * *